(12) United States Patent
Sato et al.

(10) Patent No.: US 7,844,398 B2
(45) Date of Patent: Nov. 30, 2010

(54) PATH RISK EVALUATING APPARATUS

(75) Inventors: Taichi Sato, Kyoto (JP); Kenji Mizutani, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/671,144

(22) PCT Filed: Jul. 8, 2009

(86) PCT No.: PCT/JP2009/003183

§ 371 (c)(1),
(2), (4) Date: Jan. 28, 2010

(87) PCT Pub. No.: WO2010/004744

PCT Pub. Date: Jan. 14, 2010

(65) Prior Publication Data

US 2010/0217528 A1     Aug. 26, 2010

(30) Foreign Application Priority Data

Jul. 9, 2008  (JP) .............................. 2008-179564

(51) Int. Cl.
*G05B 19/042* (2006.01)

(52) U.S. Cl. ...................... 701/301; 700/213; 700/214; 700/255; 701/1; 701/25; 701/26; 701/300

(58) Field of Classification Search ............ 701/1, 701/25, 26, 300, 301; 700/213, 214, 245, 700/255

See application file for complete search history.

(56) References Cited

U.S. PATENT DOCUMENTS

| 4,473,787 | A * | 9/1984 | Schick .................. 318/587 |
| 6,129,025 | A * | 10/2000 | Minakami et al. ......... 104/88.01 |
| 6,246,931 | B1 * | 6/2001 | Shinogi .................. 701/24 |
| 6,493,607 | B1 * | 12/2002 | Bourne et al. .............. 700/255 |
| 7,133,661 | B2 * | 11/2006 | Hatae et al. .............. 455/404.1 |
| 7,463,948 | B2 * | 12/2008 | Orita .................... 700/245 |
| 2005/0010324 | A1 * | 1/2005 | Kaever et al. ............... 700/178 |

(Continued)

FOREIGN PATENT DOCUMENTS

JP            61-105594           7/1986

(Continued)

*Primary Examiner*—Khoi Tran
*Assistant Examiner*—Nikhil Sriraman
(74) *Attorney, Agent, or Firm*—Wenderoth, Lind & Ponack, L.L.P.

(57) ABSTRACT

A path risk evaluating apparatus includes a secondary collision likelihood direction evaluating unit (108) and a secondary collision likelihood distance evaluating unit (109) which evaluate, based on the relationship between a movement path and a position of objects in an environment where a mobile device moves, the likelihood of the mobile device having primary collision with a first object and the first object further having secondary collision with a second object; a risky attribute combination evaluating unit (112) which determines degree of damage when secondary collision occurs, by referring to information, indicating degree of damage when objects in the environment collide, held by a risky attribute combination information holding unit (111); and a path evaluating unit (113) which evaluates the risk of the moving path for the mobile device, based on the evaluation result from the secondary collision likelihood direction evaluating unit (108) and the secondary collision likelihood distance evaluating unit (109) and the degree of damage determined by the risky attribute combination evaluating unit (112).

17 Claims, 24 Drawing Sheets

U.S. PATENT DOCUMENTS

| | | |
|---|---|---|
| 2005/0039783 A1* | 2/2005 | Nam ........................... 134/66 |
| 2006/0058921 A1 | 3/2006 | Okamoto |
| 2006/0104788 A1 | 5/2006 | Ban et al. |
| 2008/0161970 A1 | 7/2008 | Adachi et al. |
| 2008/0231221 A1* | 9/2008 | Ogawa .................. 318/568.12 |
| 2009/0125145 A1 | 5/2009 | Adachi et al. |
| 2010/0082194 A1* | 4/2010 | Yabushita et al. ............. 701/25 |

FOREIGN PATENT DOCUMENTS

| | | |
|---|---|---|
| JP | 63-85906 | 4/1988 |
| JP | 3-118610 | 5/1991 |
| JP | 7-72925 | 3/1995 |
| JP | 9-70786 | 3/1997 |
| JP | 2006-107475 | 4/2006 |
| JP | 3861818 | 12/2006 |
| JP | 3930490 | 6/2007 |
| JP | 2008-65755 | 3/2008 |
| JP | 2008-137127 | 6/2008 |
| WO | 2006/043396 | 4/2006 |

* cited by examiner

FIG. 2

| Object position | Attribute information |
|---|---|
| (50, 15, 0) | Cake |
| (40, 35, 0) | Garlic |
| (30, 45, 0) | Magnet |

FIG. 4

| Starting point | Ending point |
|---|---|
| (10, 35, 0) | (40, 35, 0) |

FIG. 6

| Type 1 | Type 2 |
|---|---|
| Garlic | Cake |
| Garlic | Strawberry |
| Magnet | Flexible disc |
| Carbonated drink | Lemon pop candY |
| | |

FIG. 22

| Glass sculpture |
|---|
| Plastic model |
| Flower pot |
| Cup containing beverage |
| Flour |

PATH RISK EVALUATING APPARATUS

TECHNICAL FIELD

The present invention relates to a path risk evaluating apparatus which plans a movement behavior of a mobile device such as a robot, based on a risk of a movement path of the mobile device.

BACKGROUND ART

A robot which grasps an object and moves is conventionally known (for example, see PTL 1). In the grasping of an object by a robot, it is necessary to recognize the correct relative positions of the robot and the object to be grasped, but there are cases where position measuring accuracy is insufficient and the grasping fails. In the case where the grasping fails, there are instances where, for example, the object to be grasped that collides with the robot, bounces off the robot and moves to a different place. Consequently, in order to prevent the object to be grasped from bouncing off and moving to another place, the method indicated in PTL 2 has been proposed. In this method, the robot is made to move at high speed up to the vicinity of the object to be grasped. Furthermore, after approaching a predetermined distance to the object to be grasped, the robot is made to approach the object to be grasped at low speed. Furthermore, as another method, a method of adding a positioning sensor to a robot (for example, see PTL 3) has been proposed. By using such a method, even when the robot collides with the object to be grasped, the speed during the collision is slow. As such, the instances in which the object to be grasped bounces off and moves to another place is reduced.

[Citation List]

[Patent Literature]

[PTL 1]
Japanese Patent No. 3930490

[PTL 2]
Japanese Unexamined Utility Model Application Publication No. 61-105594

[PTL 3]
Japanese Unexamined Patent Application Publication No. 09-70786

SUMMARY OF INVENTION

Technical Problem

With conventional industrial robots used in factories and so on, the bouncing off to another place of an object to be grasped that has collided with the robot can be avoided by adopting measures such as those described previously.

However, with a robot that is used in a complex environment such as the household environment, there are cases where collision between the robot and objects including the object to be grasped cannot be avoided using the aforementioned measures.

First is the case where collision between the robot and an object occurs because the object position recognition accuracy of a robot used in a household environment is low compared to that of an industrial robot. In the household environment, since people and robot are present together, the locations at which a position sensor can be placed are limited to within a range that does not interfere with the people.

Furthermore, it is possible to have various types of objects for the object to be grasped and the objects around the object to be grasped. As such, it is easy to fail to recognize the position of the object to be grasped, and there is a tendency for the occurrence of collision between the robot and an object.

Second is the case where collision between the robot and an object occurs because the control of the robot cannot be performed as accurately as with an industrial robot. For example, since the shape of the floor in which the robot operates in the household environment is varied compared to a factory, there are instances where the robot assumes an unstable posture. Furthermore, it is difficult to perform regular maintenance in the household environment as compared to a factory and so on. Moreover, there are cases where the robot itself vibrates due to the vibration of a motor provided for cooling the robot, and the like. As such, controlling the robot tends to be inaccurate and thus there is a tendency for the occurrence of collision between the robot and an object.

Third is the case where collision between the robot and an object occurs because the limitation on the time for executing a task is severe. The robot used in the household environment is required to move at a relatively high speed so as not to interfere with humans. As such, in the case of planning a behavior prioritizing high-speed movement over collision avoidance, there is a tendency for the occurrence of collision between the robot and an object.

As described thus far, in a complex environment such as the household environment, avoiding collisions between the robot and the object to be grasped is difficult. Furthermore, there are cases where the robot collides with an object other than the object to be grasped. As such, there are cases where the robot or a part thereof collides with a first object, and the first object or a part thereof moves due to the impact. In addition, there are cases where the first object or a part thereof which has moved comes into contact with or comes close to a neighboring second object. At that time, depending on the combination of types of the first object and the second object, there is a problem of damage occurring due to the first object and second object coming into contact with or coming close to each other.

A first example of this problem occurs when the robot is moving. Specifically, there are cases where, during the movement of the robot, the robot collides with the first object present in the movement path. Subsequently, the first object that was hit moves and, in addition, comes into contact with or comes close to a nearby second object and thereby creating damage.

A second example of this problem occurs when the robot is grasping an object. Specifically, there are cases where, when the robot is grasping an object to be grasped, the robot fails to grasp and causes the object to be grasped to bounce off. Subsequently, the object to be grasped that has bounced off comes into contact with or comes close to a neighboring object thereby creating damage.

A third example of this problem occurs when the robot is transporting an object. Specifically, there are cases where, when the robot is transporting an object, the first object which is being transported comes into contact with or comes close to a second object which is in the vicinity of the path through which the first object is being transported. At that time, depending on the combination of the types of the first object and the second object, damage occurs due to the contact with or the proximity.

The present invention is conceived in view of the aforementioned problem and has as an objective to provide a path risk evaluating apparatus capable of reducing damage, or the risk of damage, brought about by an object being moved as a result of the movement of a robot, and the moved object coming into contact with or coming close to a neighboring object.

Solution to Problem

In order to achieve the aforementioned objective, the path risk evaluating apparatus in an aspect of the present invention is a path risk evaluating apparatus for evaluating risk of a movement path of a moving device, the path risk evaluating apparatus including: a path holding unit configured to hold movement path information which is information indicating a movement path of the mobile device; an object position attribute holding unit configured to hold position information indicating positions of objects present in an environment in which the mobile device moves; a risky attribute combination information holding unit configured to hold information indicating degrees of damage in the case where pairs of the objects in the environment come into contact with or come close to each other; a secondary collision likelihood evaluating unit configured to evaluate a likelihood of a first object that has a likelihood of being moved by contact with the mobile device coming into contact with or coming close to a second object, based on a relationship between the movement path of the mobile device indicated in the movement path information held by the path holding unit and the positions of the objects indicated in the position information held by the object position attribute holding unit; a risky attribute combination evaluating unit configured to determine a degree of damage in the case where the first object and the second object come into contact with or come close to each other, by referring to the information indicating the degrees of damage held by the risky attribute combination information holding unit; and a path evaluating unit configured to evaluate the risk of the movement path for the mobile device, based on a result of the evaluation by the secondary collision likelihood evaluation unit and the degree of damage determined by the risky attribute combination evaluating unit.

According to this configuration, it is possible to evaluate the risk of a movement path with respect to a mobile device based on both the likelihood of a secondary collision in which a first object and a second object come into contact with or come close to each other due to the movement of the first object brought about by the mobile device and the first object coming into contact with or coming close to each other, and the degree of damage in the case where such secondary collision occurs. With this, the selection of a movement path having a high damage risk due to secondary collision, as the movement path of the mobile device, is eliminated, and thus damage risk due to secondary collision can be reduced.

It should be noted that the present invention can be implemented, not only as a path risk evaluating apparatus including the characteristic processing units as described above, but also as a path risk evaluating method having, as steps, the characteristic processing units included in the path risk evaluating apparatus, or as a program causing a computer to execute the characteristic steps included in the path risk evaluating method. In addition, it goes without saying that such a program can be distributed via a computer-readable recording medium such as a Compact Disc-Read Only Memory (CD-ROM) or a communication network such as the Internet.

Advantageous Effects of Invention

The present invention is capable of reducing damage, or the risk of damage, brought about by an object being moved as a result of the movement of a robot, and the moved object coming into contact with or coming close to a neighboring object.

BRIEF DESCRIPTION OF DRAWINGS

FIG. 1 is a block diagram showing the configuration of a behavior planning apparatus in a first embodiment.
[FIG. 2]
FIG. 2 is a diagram showing an example of object position attribute information held by an object position attribute holding unit in the first embodiment.
FIG. 3 is a diagram showing an example of the arrangement of objects in the first embodiment.
[FIG. 4]
FIG. 4 is a diagram showing an example of a path held by a path holding unit in the first embodiment.
FIG. 5 is a diagram showing an example of an angle created by a straight line, which connects the object to be grasped and the neighboring object, and the path of the robot, in the first embodiment.
[FIG. 6]
FIG. 6 is a diagram showing an example of the risky attribute combinations held by the risky attribute combination information holding unit in the first embodiment.
FIG. 7 is a flowchart showing the flow of processes performed by the behavior planning apparatus in the first embodiment.
FIG. 8 is a diagram for describing the method for calculating the secondary collision likelihood direction evaluation value and the secondary collision likelihood distance evaluation value in the case where the size of the neighboring object is taken into consideration.
FIG. 9 is a diagram for describing the method for calculating the secondary collision likelihood direction evaluation value and the secondary collision likelihood distance evaluation value in the case where the size of the neighboring object is taken into consideration.
FIG. 10 is a diagram for describing the method for calculating the secondary collision likelihood direction evaluation value and the secondary collision likelihood distance evaluation value in the case where the size of the object to be grasped and the neighboring object are taken into consideration.
FIG. 11 is a diagram showing the configuration of a robot system in a second embodiment.
FIG. 12 is a diagram showing the configuration of a robot arm in a third embodiment.
FIG. 13 is a block diagram showing the configuration of a behavior planning apparatus in the third embodiment.
FIG. 14 is a block diagram showing the configuration of a behavior planning apparatus in a fourth embodiment.
FIG. 15 is a flowchart showing the flow of processes performed by the behavior planning apparatus in the fourth embodiment.

FIG. 16 is a diagram showing an initial path of a robot in a fifth embodiment.

FIG. 17 is a diagram showing an improved path of the robot in the fifth embodiment.

FIG. 18 is a block diagram showing the configuration of a behavior planning apparatus in the fifth embodiment.

FIG. 19 is a diagram showing an example of plural paths which allow execution of the same task in a sixth embodiment.

FIG. 20 is a block diagram showing the configuration of a behavior planning apparatus in the sixth embodiment.

FIG. 21 is a block diagram showing the configuration of a behavior planning apparatus in a seventh embodiment.

[FIG. 22]

FIG. 22 is a diagram showing an example of primary collision risky attribute information held by a primary collision risky attribute information holding unit in the seventh embodiment.

FIG. 23 is a flowchart showing the flow of processes performed by the behavior planning apparatus in the seventh embodiment.

FIG. 24 is a block diagram showing the configuration of a behavior planning apparatus in an eighth embodiment.

FIG. 25 is a flowchart showing the flow of processes performed by the behavior planning apparatus in the eighth embodiment.

DESCRIPTION OF EMBODIMENTS

First Embodiment

In a first embodiment of the present invention, a behavior planning apparatus which plans the behavior of a robot which grasps a specified object shall be described. The behavior planning apparatus determines the movement speed when a robot approaches an object to be grasped in the case where the robot is to grasp an object to be grasped.

<Secondary Collision>

There are cases where, when the robot approaches the object to be grasped, the robot fails to grasp the object to be grasped and causes the object to be grasped to bounce off (hereafter called "primary collision"). This is caused by inaccuracy of the obtained object position, inaccuracy of robot controlling, or high-speed movement in accordance with a demand for high-speed movement, and so on. Furthermore, there are cases where the object that has bounced off the robot further comes into contact with or comes close to a neighboring object (hereafter called "secondary collision"). At that time, damage is created depending on the combination of the first object, which comes into direct contact with the robot, and the second object that comes into contact with the first object.

For example, when garlic bounces off the robot and collides with a cake, the smell of the garlic sticks to the cake and thus damage is created. Further, in the case where a magnet bounces off the robot and comes close to a flexible disc, the data in the flexible disc is corrupted due to the magnetism of the magnet such that damage is created.

<Behavior Planning Apparatus>

Figure 1:
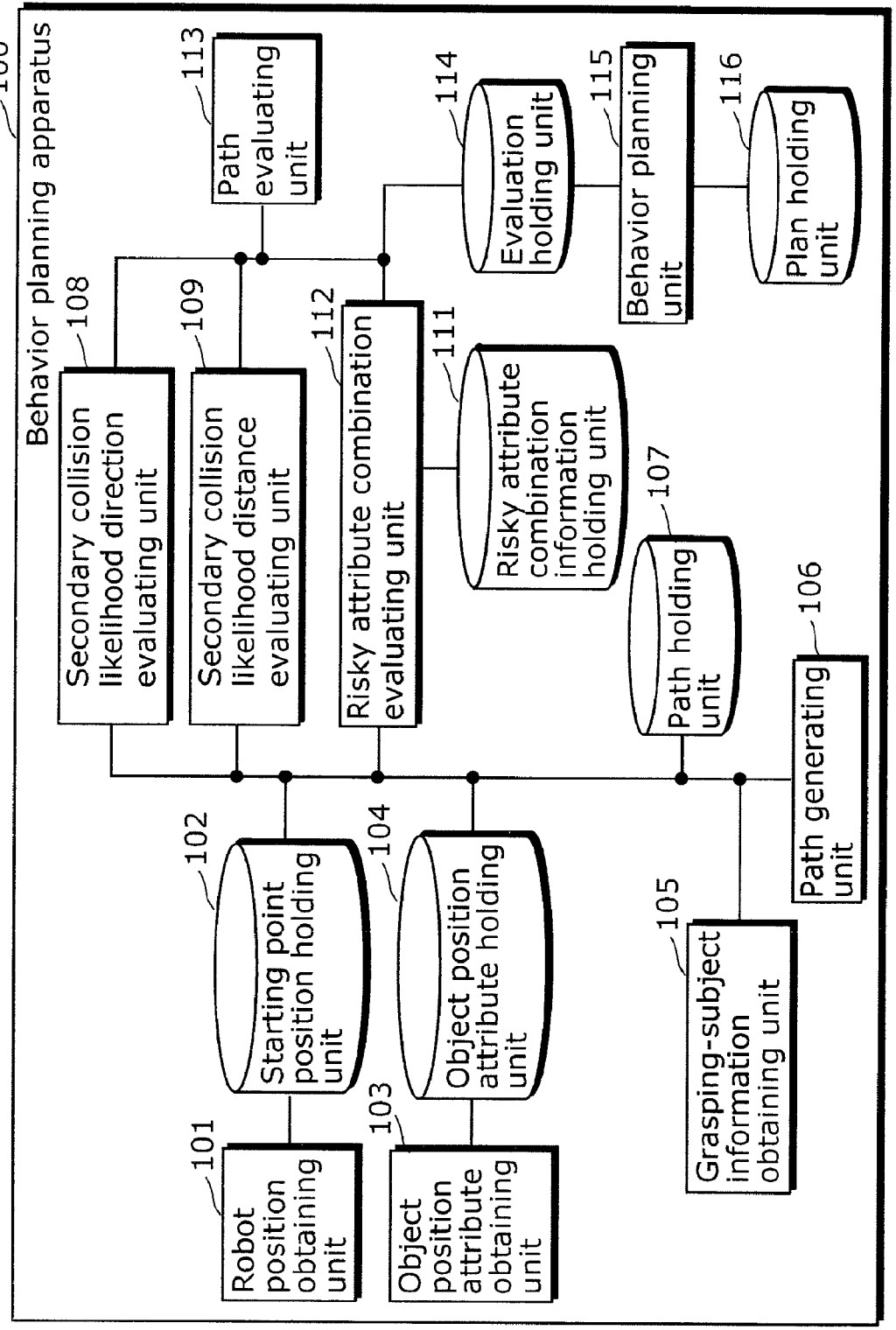
[FIG. 1]

FIG. 1 is a block diagram showing the configuration of a behavior planning apparatus 100 which plans the behavior of a robot which grasps a specified object.

The behavior planning apparatus 100 includes a robot position obtaining unit 101, a starting point position holding unit 102, an object position attribute obtaining unit 103, an object position attribute holding unit 104, a grasping-subject information obtaining unit 105, a path generating unit 106, a path holding unit 107, a secondary collision likelihood direction evaluating unit 108, a secondary collision likelihood distance evaluating unit 109, a risky attribute combination information holding unit 111, a risky attribute combination evaluating unit 112, a path evaluating unit 113, an evaluation holding unit 114, a behavior planning unit 115, and a plan holding unit 116. The behavior planning apparatus 100 is implemented by executing, in the CPU of a computer, a program for implementing the functions of the respective processing units included in the behavior planning apparatus 100.

Hereinafter, the respective constituent elements shall be described.

The robot position obtaining unit 101 is a processing unit which obtains the robot position, and stores the obtained robot position in the starting point position holding unit 102, as a starting point of a movement path of the robot. Specifically, the robot position is, for example, obtained using a Global Positioning System (GPS), or obtained by performing image processing on an image obtained from a camera provided in the environment in which the robot moves or in the robot. It should be noted that in the description made hereafter, the environment in which the robot moves shall be called "environment" and a camera provided in the environment in which the robot moves or in the robot shall be called "camera" without particular explanation.

The starting point position holding unit 102 is a storage device for storing the robot position which is the starting point of the movement path of the robot obtained by the robot position obtaining unit 101, and is configured of a Hard Disk Drive (HDD) and so on, for example.

The object position attribute obtaining unit 103 is a processing unit which obtains the position and attribute information of an object that is present within the environment. Here, attribute information refers information indicating the type of an object, such as "cake", "garlic", "magnet", and "flexible disc", for example.

A Radio Frequency Identification (RFID) tag, for example, is used in the obtainment of the position and attribute information of the object. Specifically, an RFID tag in which attribute information is written is assigned in advance to each object in the environment, and the position and attribute information of an object is obtained using known RFID wireless technology. Furthermore, for example, image processing is used. Specifically, the position and attribute information of an object is obtained by applying known image processing technology on image information obtained from the camera.

Figure 3:
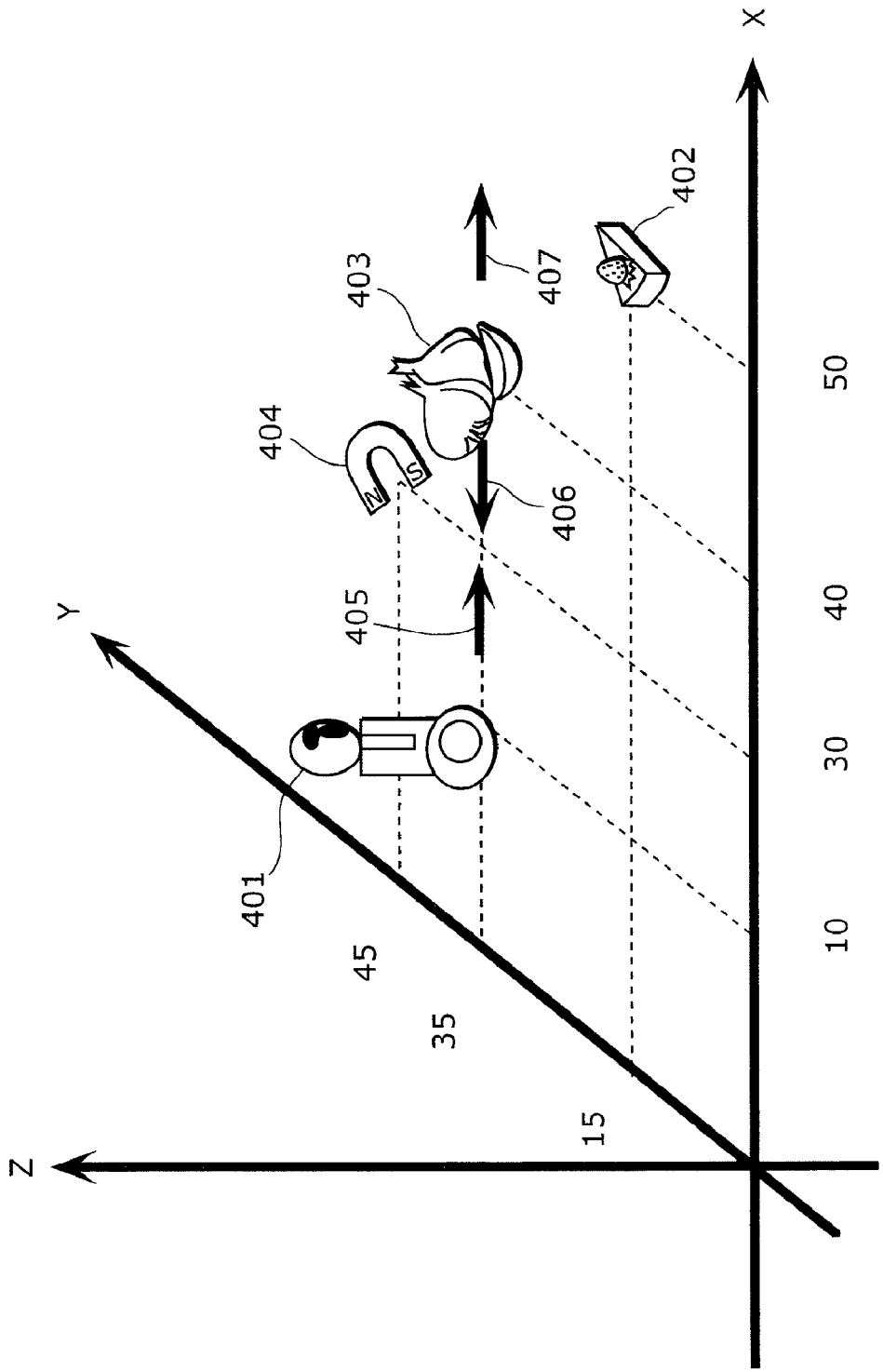
[FIG. 3]

The object position attribute holding unit 104 is a storage device which holds the position and attribute information of respective objects obtained by the object position attribute obtaining unit 103. FIG. 2 is a diagram showing an example of object position attribute information held by the object position attribute holding unit 104. The object position attribute holding unit 104 holds zero or more pieces of object position attribute information consisting of the set of the information indicating the position of the object and attribute information of the object. The example in FIG. 2 shows that a cake is located in the three-dimensional position (50, 15, 0), garlic is located in (40, 35, 0), and a magnet is located in (30, 45, 0). FIG. 3 is a diagram showing the positional relationship of objects in the case where a cake 402, garlic 403, and a magnet 404, which are the objects indicated in the attribute information of objects, are arranged in the object positions shown in the example. FIG. 3 shows an example in which a robot 401 is present in the three-dimensional position (10, 35, 0), in addition to the cake 402, the garlic 403, and the magnet 404.

The grasping-subject information obtaining unit 105 is a processing unit which obtains the position and the type of an object to be grasped. Specifically, for example, the grasping-subject information obtaining unit 105 obtains, using a speech input device not shown in the figure, speech regarding the type of the object to be grasped that is uttered by the user. The grasping-subject information obtaining unit 105 obtains the type of the object to be grasped by performing speech analysis on the obtained speech, using known speech analysis processing. The grasping-subject information obtaining unit 105 obtains, from the object position attribute holding unit 104, the position of an object to be grasped that is of a classification having the same name as the obtained classification. The grasping-subject information obtaining unit 105 outputs the obtained position of the object to be grasped to the secondary collision likelihood direction evaluating unit 108, the secondary collision likelihood distance evaluating unit 109, and the path evaluating unit 113, and outputs the obtained attribute information to the risky attribute combination evaluating unit 112.

As to the method for specifying the object to be grasped, not only for this example, the position and attribute information of objects held by the object position attribute holding unit 104 may be displayed on a display device not shown in the figure, with one of which being determined as the object to be grasped according to a user's selection. Furthermore, the object to be grasped may be determined based on the user's action or other information obtained from the outside. For example, the behavior planning apparatus may obtain a forecast from a processing unit, which is not shown in the figure, that obtains weather forecasts, and determine an umbrella as the object to be grasped in the case where the user wears his shoes at a time or on a day for which the forecast indicates rain.

The path generating unit 106 is a processing unit which generates a path for moving the robot, which is in the robot position that is the starting point of a movement path of the robot and which is held by the starting point position holding unit 102, to the position where the object to be grasped obtained by the grasping-subject information obtaining unit 105 is located. Specifically, for example, the path is assumed to be the directed line segment having the robot position as a starting point and the position at which the object to be grasped is located as an ending point.

The path holding unit 107 is a storage device which holds the path generated by the path generating unit 106, and is configured using, for example, an HDD and so on.

Figure 4:
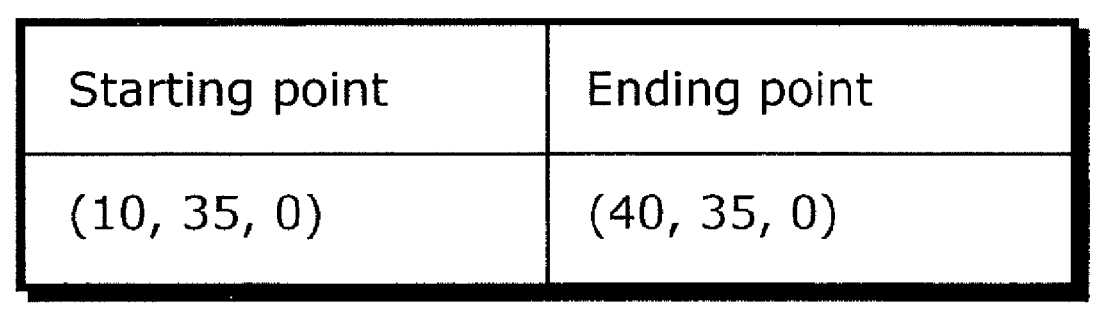

FIG. 4 is a diagram showing an example of a path held by the path holding unit 107. This example indicates a path for the case where the robot position, which is the starting point of the movement path of the robot and which is held by the starting point position holding unit 102, is (10, 35, 0), and the position of the object to be grasped is (40, 30, 0). This indicates the path when the robot moves in order to grasp the garlic in the situation in which objects (the cake 402, the garlic 403, and the magnet 404) and the robot 401 are present in the positional relationship in FIG. 3.

The secondary collision likelihood direction evaluating unit 108 is a processing unit which evaluates how collision-prone the direction of an object specified out of objects present in the environment is with respect to the object to be grasped. In the subsequent description, this evaluation shall be called "secondary collision likelihood direction evaluation", and the evaluation value calculated at that time shall be called "secondary collision likelihood direction evaluation value". The secondary collision likelihood direction evaluation is one of the evaluations for estimating the likelihood of a secondary collision. It should be noted that the specification of an object may be performed by selecting, one at a time, arbitrary objects other than the object to be grasped.

The likelihood of a secondary collision according to the secondary collision likelihood direction evaluation can be estimated based on the angle created between a straight line, which connects the object to be grasped and a neighboring object, and the path of the robot. The object to be grasped has a likely tumbling direction and an unlikely tumbling direction. For example, in a situation in which the robot 401 is at position (10, 35, 0) and the garlic 403 is at position (40, 35, 0) as shown in FIG. 3, assume that the robot 401 moves in an X-axis direction 405. At this time, the garlic 403 is likely to tumble in a positive direction 407 in the X-axis direction, and is not likely to tumble in a negative direction 406 in the X-axis direction. In other words, the garlic 403 is likely to tumble in the same direction as the movement path of the robot 401, and is not likely to tumble in the opposite direction. This coincides with the common assumption that it is unlikely that the object to be grasped will push aside the robot itself and move in the direction that is blocked by the robot. To be precise, there are cases where, depending on conditions such as when there is a wall in the same direction as the movement path of the robot or when the floor is bumpy, it cannot be said that tumbling in the same direction as the path of the robot is likely. However, here, for the sake of simplicity, condition judgment that takes into consideration conditions such as floors and walls shall be disregarded. This makes it possible to estimate that the likelihood of a collision is high when the angle created between the straight line, which connects the object to be grasped and a neighboring object, and the path of the robot is small, and that the likelihood of a collision is low when the created angle is big. In the example in FIG. 3, the cake 402 at position (50, 15, 0) has a high likelihood of having secondary collision with the garlic 403 which is the object to be grasped, and the magnet at position (30, 45, 0) has a low likelihood of collision.

As an example, here, it is assumed that the angle created between a vector, which connects the position of the object to be grasped and the position of the specified object, and the path of the robot is θ, and the secondary collision likelihood direction evaluation value is $(1+\cos\theta)/2$. When such an evaluation is performed, the largest value for the secondary collision likelihood direction evaluation value is 1 and the smallest value is 0. The more the specified object is in a direction that is prone to secondary collision with the object to be grasped (the closer the created angle θ is to 0 degrees), the closer to the largest value 1 the value for the secondary collision likelihood direction evaluation value becomes. Furthermore, the more it is in a direction in which a secondary collision is not likely to occur (the closer the created angle θ is to 180 degrees), the closer to the smallest value 0 the value for the secondary collision likelihood direction evaluation value becomes. It should be noted that it is assumed that the created angle θ is a value between 0 degrees and 180 degrees.

Figure 5:
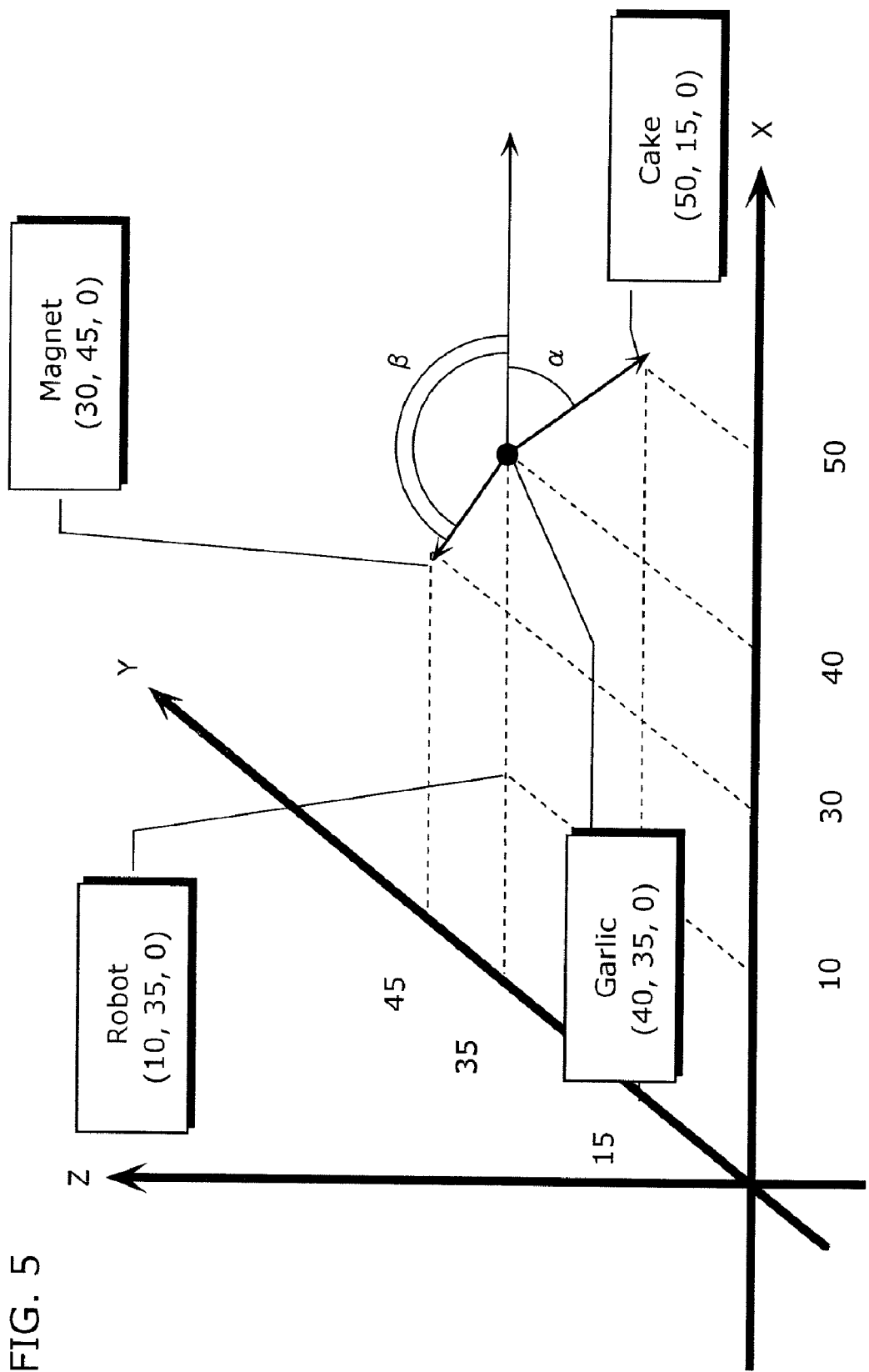
[FIG. 5]

FIG. 5 is an example showing the angle created between a vector, which connects the position of the object to be grasped and the position of an object in the environment, and the path of the robot. α in the figure denotes the created angle when the object to be grasped is the garlic and the object in the environment is the cake, and β in the figure denotes the created angle when the object to be grasped is the garlic and the object in the environment is the magnet.

First, the secondary collision likelihood direction evaluating unit 108 obtains the path of the robot from the path holding unit 107. In other words, the secondary collision likelihood direction evaluating unit 108 obtains the starting point and the ending point of the path of the robot. The secondary collision likelihood direction evaluating unit 108 obtains the position of the specified object, from the object position attribute holding unit 104. The secondary collision likelihood direction evaluating unit 108 calculates the aforementioned secondary collision likelihood direction evaluation value, and outputs the calculation result to the path evaluating unit 113.

The secondary collision likelihood distance evaluating unit 109 is a processing unit which evaluates how collision-prone the distance of the specified object is with respect to the object to be grasped. In the subsequent description, this evaluation shall be called "secondary collision likelihood distance evaluation", and the evaluation value calculated at that time shall be called "secondary collision likelihood distance evaluation value".

The secondary collision likelihood distance evaluation is one of the evaluations for estimating the likelihood of a secondary collision.

The secondary collision likelihood distance evaluation can be estimated based on the distance between the object to be grasped and a neighboring object. When the object to be grasped collides with the robot and moves, the object to be grasped will eventually stop due to the friction with the floor. Therefore, a neighboring object that is at a shorter distance to the object to be grasped is more prone to collide with the object to be grasped. Furthermore, even when a condition in which there is no friction with the floor and the object to be grasped may slide without end is assumed, the farther a neighboring object is from the object to be grasped, the lower is the likelihood that the neighboring object will be in the direction in which the object to be grasped will tumble, and thus the occurrence of a secondary collision is less likely.

To be precise, there are cases where these estimates are not viable. For example, when the object to be grasped is a bag containing soybeans, it is possible for the robot to collide with the bag such that the soybeans roll out in all directions. When there are a sufficiently large number of soybeans and there is no friction with the floor, the importance of distance and direction is low. Although, under ordinary circumstances, it is possible to have a judgment process for whether or not a situation falls under such a case, such a judgment process shall be omitted in the first embodiment.

Here, it is assumed that the distance between the position of the object to be grasped and the position of the specified object is r, and a Euler number e raised to the power of $-r$ ($e^{-r}$) is the secondary collision likelihood distance evaluation value. In the case where such an evaluation is performed, when the distance is 0, the secondary collision likelihood distance evaluation value becomes a largest value 1, and when the distance is infinity, the secondary collision likelihood distance evaluation value becomes a smallest value 0. Specifically, the secondary collision likelihood distance evaluation value becomes a value approaching 1, which is the largest value, as the specified object is at a closer distance which is more prone to collision with the object to be grasped, and becomes a value approaching 0, which is the smallest value, as the specified object is at a farther distance which is less prone to collision. It should be noted that the Euler number is also called Napier number, and has 2.71828 . . . as a specific value. The equation for the secondary collision likelihood distance evaluation may be another equation as long as it is an equation in which the value becomes smaller as the distance increases. Furthermore, it may also be an equation according to a physical model that takes into consideration energy loss due to friction.

The secondary collision likelihood distance evaluating unit 109 obtains the position of the specified object, from the object position attribute holding unit 104. The secondary collision likelihood distance evaluating unit 109 obtains the position of the object to be grasped, from the grasping-subject information obtaining unit 105. The secondary collision likelihood distance evaluating unit 109 calculates the distance between the two objects, calculates the secondary collision likelihood distance evaluation value based on the distance, and outputs the result to the path evaluating unit 113.

The risky attribute combination information holding unit 111 holds information indicating secondary collisions between objects of which type of attribute information are likely to create damage. FIG. 6 is a diagram showing an example of risky attribute combination information. For example, combinations of objects that create damage in the case of a secondary collision are the combination of the garlic and the cake, and the combination of the magnet and the flexible disc.

The risky attribute combination evaluating unit 112 is a processing unit which evaluates whether the specified object is an object that is likely to create damage in the case of a secondary collision with the object to be grasped. In the subsequent description, this evaluation shall be called "risky attribute combination evaluation", and the evaluation value calculated at that time shall be called a "risky attribute combination evaluation value".

The risky attribute combination evaluation is an evaluation for estimating the degree of damage when a secondary collision occurs. Damage is not necessarily created even when the object to be grasped and the neighboring object have a secondary collision. For example, damage is not created even when a clean spoon and fork have a secondary collision. Furthermore, even when damage is created, the level of such damage is different. For example, in the case where the magnet and the flexible disc collide, the value of the data stored in the flexible disc becomes the amount of the damage, and at times this could be extensive damage. Inversely, the case where the magnet and a strawberry collide can be considered as a case where damage is small. The effort of a person washing the strawberry or the time and energy of the robot washing the strawberry becomes the damage but the degree of damage is small.

In this manner, although the degrees of damage are varied, the degree of damage is evaluated in two stages in the first embodiment. Specifically, these are divided into two cases, namely, the case where the degree of damage is sufficiently small to be disregarded, and the case where the degree of damage is of a magnitude that cannot be disregarded. When the degree of damage is small, robot behavior planning in which secondary collision avoidance is not executed, is performed. The judgment for whether the degree of damage is small or big is performed by judging whether the combination of the object to be grasped and the neighboring object is a combination that creates damage.

The risky attribute combination evaluating unit 112 performs risky attribute combination evaluation on the specified object.

First, the risky attribute combination evaluating unit 112 obtains the attribute information of the object to be grasped and the attribute information of the specified object. The risky attribute combination evaluating unit 112 judges whether or not the combination of the two attribute information obtained is included in the risky attribute combinations held by the risky attribute combination information holding unit 111. The risky attribute combination evaluating unit 112 outputs the judgment result to the path evaluating unit 113. The risky attribute combination evaluating unit 112 sets the judgment result to "1" when the combination of the two attribute information is included in the risky attribute combinations, and sets the judgment result to "0" when not included. It should be noted that the risky attribute combination information shown in FIG. 6 may be provided with a monetary amount column so as to include the damage monetary amount in a collision between objects of two attribute information. In this case, when the combination of the two attribute information is included in the risky attribute combinations, the risky attribute combination evaluating unit 112 sets the damage monetary value thereof as the judgment result, and sets the judgment result to "0" when not included.

The path evaluating unit 113 is a processing unit which evaluates damage risk due to secondary collision in the case where the robot moves in the path held by the path holding unit 107.

The first embodiment provides a robot behavior planning apparatus which does not avoid a primary collision, per se, which is the collision between the robot and the object to be grasped, but avoids a primary collision in the case where the damage risk is high. Here, "damage risk" refers to the evaluation of a combination of the likelihood that a secondary collision will occur and the degree of damage when the secondary collision occurs. Specifically, the damage risk is assumed to be, for example, the product of the likelihood that a secondary collision will occur and the degree of damage when the secondary collision occurs. In other words, a behavior planning apparatus which plans a behavior that avoids a primary collision when it is predicted that the likelihood of a secondary collision is high and the degree of damage when the secondary collision occurs is large, is provided.

<Perspective on the Likelihood of a Secondary Collision>

Description regarding the likelihood of a secondary collision shall be made. A secondary collision does not necessarily occur even when the robot and the object to be grasped have a primary collision. A rough prediction as to whether the object to be grasped and a neighboring object will have a secondary collision can be obtained by simulation.

As parameters in the simulation, there are parameters concerning robot behavior planning, in addition to parameters concerning the object to be grasped, parameters concerning an object in the neighborhood of the object to be grasped, and parameters concerning the environment. The parameters concerning the object to be grasped can include the size, shape, mass, friction coefficient, and position of the object to be grasped. The parameters concerning the neighboring object can include the size, shape, mass, friction coefficient, and position of the neighboring object. The parameters concerning the environment can include the shape and friction coefficient of the floor, the wind strength, the atmospheric pressure, and so on. The parameters concerning the robot behavior planning can include a parameter on the particular speed at which the robot moves at a particular position.

However, performing a precise simulation using all of these parameters takes time and there are cases where accurate prediction is difficult even when much time is taken. First, with regard to time, the calculations in the simulation per se, or the obtaining of the values of the parameters takes time. Furthermore, with regard to accuracy, due to slight errors in part of the parameters and slight differences between the physical model and the actual physical phenomena, there are instances where it is judged that a secondary collision will not occur although a secondary collision will actually occur, and vice-versa.

If a statistical simulation which predicts various values for parameters having unknown values or parameters having inaccurate values were to be performed as a countermeasure, a considerable amount of time will be consumed.

Furthermore, even when such a statistical simulation is performed, it is possible to have a prediction where the likelihood of colliding and the likelihood of not colliding are the same and thus there are cases where an accurate prediction cannot be obtained despite using up a considerable amount of time.

Consequently, in the present embodiment, in place of performing a precise simulation, a rough likelihood of whether or not secondary collision will occur is estimated for each neighboring object of the object to be grasped, using data that is comparatively easy to obtain. Specifically, the estimation of the likelihood of a secondary collision is performed using the secondary collision likelihood direction evaluation resulting from the evaluation by the secondary collision likelihood direction evaluating unit 108, and the secondary collision likelihood distance evaluation resulting from the evaluation by the secondary collision likelihood distance evaluating unit 109.

Next, the policy regarding the evaluation shall be described. The path evaluating unit 113 sets, as candidates for a secondary collision partner, the objects in the environment other than the object to be grasped and the robot, evaluates damage risk due to secondary collision for each of the candidates, and sets the total thereof as the evaluation of the path of the robot.

The damage risk for each candidate is calculated as the product of the likelihood of a secondary collision and the degree of damage when the secondary collision occurs. The likelihood of a secondary collision is evaluated based on the secondary collision likelihood direction evaluation and the secondary collision likelihood distance evaluation obtained by the secondary collision likelihood direction evaluating unit 108 and the secondary collision likelihood distance evaluating unit 109, respectively. Here, the product of secondary collision likelihood direction evaluation and the secondary collision likelihood distance evaluation is assumed to be the evaluation value for the likelihood of a secondary collision.

For the degree of damage when the secondary collision occurs, the risky attribute combination evaluation obtained by the risky attribute combination evaluating unit 112 is used.

Next, the path evaluation performed by the path evaluating unit 113 shall be described. First, the path evaluating unit 113 obtains the position of the object to be grasped, from the grasping-subject information obtaining unit 105. The path evaluating unit 113 specifies each object (other than the object to be grasped) corresponding to attribute information held by the object position attribute holding unit 104, and performs processes (A) to (D) below.

(A) Obtain the secondary collision likelihood direction evaluation from the secondary collision likelihood direction evaluating unit 108.

(B) Obtain the secondary collision likelihood distance evaluation from the secondary collision likelihood distance evaluating unit 109.

(C) Obtain the risky attribute combination evaluation from the risky attribute combination evaluating unit 112.

(D) Set, as the damage risk evaluation for the specified object, (secondary collision likelihood direction evaluation)×(secondary collision likelihood distance evaluation)×(risky attribute combination evaluation).

The path evaluating unit 113 calculates the total value of the damage risk in a secondary collision between each object and the object to be grasped, calculated in aforementioned (D), and stores the calculated total value in the evaluation holding unit 114, as the path evaluation value. A lower path evaluation is a better evaluation having smaller risk; a higher path evaluation is a poorer evaluation having a higher damage risk.

The evaluation holding unit 114 is a storage device which holds the evaluation of a path evaluated by the path evaluating unit 113, and is configured of an HDD and the like.

The behavior planning unit 115 is a processing unit which plans a behavior that avoids secondary collision in the case where damage risk is high based on the path evaluation, which is the damage risk of a path, held by the evaluation holding unit 114. Specifically, the behavior planning unit 115 plans a behavior for low-speed movement when the path evaluation is higher than a predetermined value, and plans a behavior for high-speed movement when the path evaluation is lower. It should be noted that there are cases where the predetermined value cannot be appropriately set from the start and cases where it may no longer fit the situation in midstream. Consequently, a configuration which allows learning and updating using a commonly known learning algorithm may be adopted for the predetermined value.

The plan holding unit 116 is a storage device which holds information indicating the behavior planning performed by the behavior planning unit 115, and is configured of an HDD and the like. Specifically, the plan holding unit 116 holds the speed for moving on the path.

<Process Flow>

Figure 7:
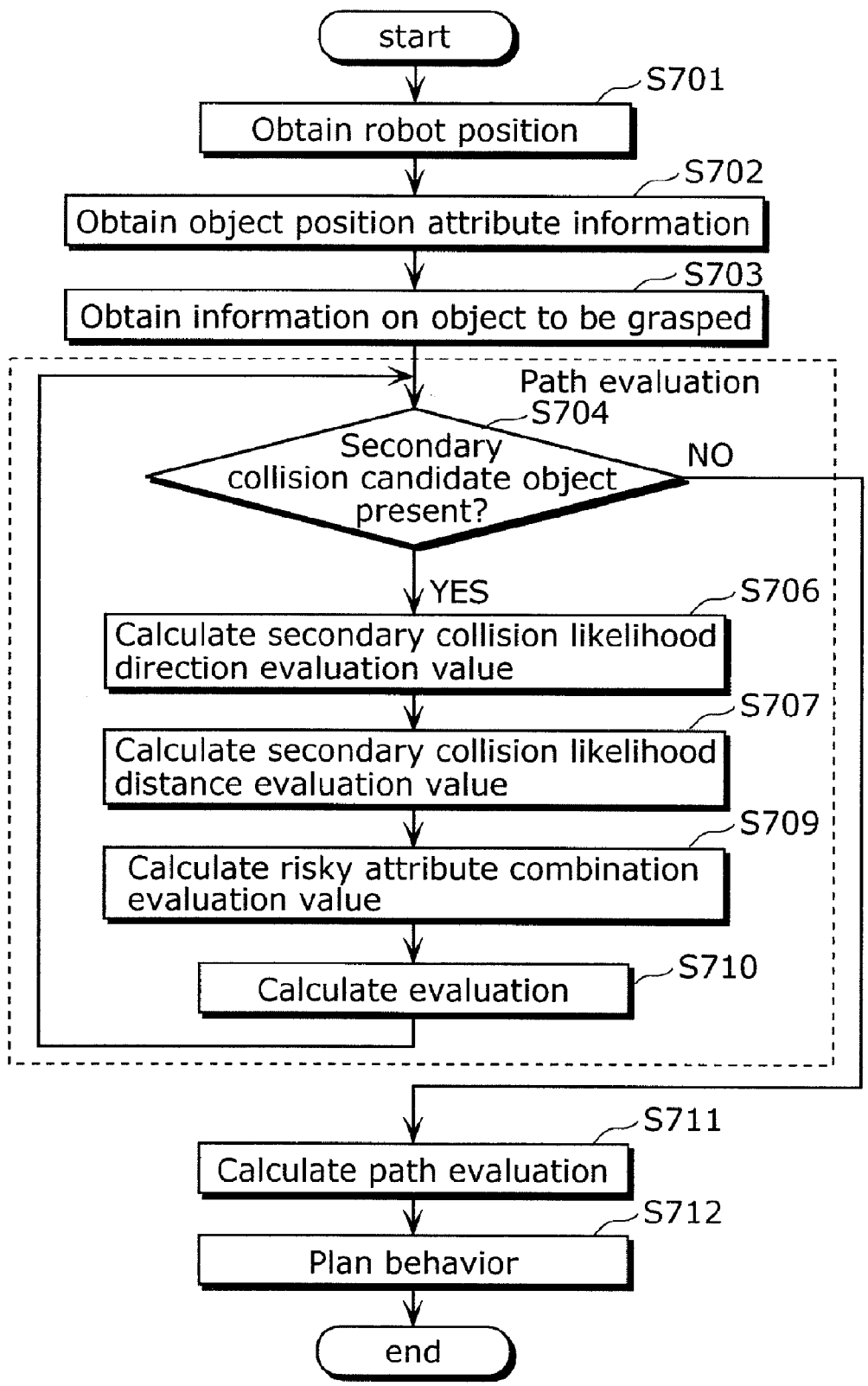
[FIG. 7]

The flow of the behavior planning performed by the behavior planning apparatus 100 is shown in FIG. 7.

The robot position obtaining unit 101 obtains the robot position, and stores this in the starting point position holding unit 102 (step S701). Specifically, in the case where the robot 401 is at the position shown in FIG. 3, the robot position obtaining unit 101 stores, in the starting point position holding unit 102, (10, 35, 0) which is the position of the robot 401.

The object position attribute obtaining unit 103 obtains the object position attribute information of objects that are present in the environment, and stores these in the object position attribute holding unit 104 (step S702).

Specifically, in the case where each object is present in the positions shown in FIG. 3, the object position attribute information of "magnet", "garlic", and "cake" is stored in the object position attribute holding unit 104. In this case, the object position attribute information stored in the object position attribute holding unit 104 is the information shown in FIG. 2.

The grasping-subject information obtaining unit 105 obtains the position of the object to be grasped, and outputs this to the secondary collision likelihood direction evaluating unit 108, the secondary collision likelihood distance evaluating unit 109, and the path evaluating unit 113. Furthermore, the grasping-subject information obtaining unit 105 outputs the attribute information of the object to be grasped to the risky attribute combination evaluating unit 112 (step S703).

Specifically, for example, in the case where the "garlic" shown in FIG. 3 is obtained as the object to be grasped, the grasping-subject information obtaining unit 105 outputs (40, 35, 0), which is the position of the garlic, to the secondary collision likelihood direction evaluating unit 108, the secondary collision likelihood distance evaluating unit 109, and the path evaluating unit 113. Furthermore, the grasping-subject information obtaining unit 105 outputs the attribute information "garlic" of the object to be grasped to the risky attribute combination evaluating unit 112.

The path evaluating unit 113 judges whether or not there are objects not obtained as a secondary collision candidate object, among the objects corresponding to the attribute information held by the object position attribute holding unit 104 (step S704). When there are objects that have not yet been obtained as a secondary collision candidate object (YES in step S704), the path evaluating unit 113 arbitrarily selects one of the not-yet-selected objects, and sets the selected object as a secondary collision candidate object. It should be noted that the robot and the object to be grasped are not assumed to be secondary collision candidate objects. Specifically, in the case of FIG. 3, the "magnet" and "cake" are assumed to be secondary collision candidate objects.

The secondary collision likelihood direction evaluating unit 108 calculates the secondary collision likelihood direction evaluation value of the object specified as the secondary collision candidate object, and outputs the calculation result to the path evaluating unit 113 (step S706).

Specifically, in the case of FIG. 3, when the "cake" is the secondary collision candidate object, the vector connecting the "garlic" and "cake" is (50−40, 15−35, 0), that is, the vector (10, −20, 0). Furthermore, the movement path connecting the position (40, 35, 0) of the "garlic", which is the object to be grasped, and the position (10, 35, 0) of the robot is the vector (30, 0, 0). Therefore, the inner product of these vectors is calculated using equation 1 below.

$$(10)\times(30)+(-20)\times(0)+(0)\times(0)=300 \qquad \text{Equation 1}$$

Furthermore, the length of the respective vectors is expressed by equation 2 and equation 3.

[Math 1]

$$\{(10)^2+-(20)^2+(0)^2\}^{1/2}=0\sqrt{5} \qquad \text{Equation 2}$$

$$\{(30)^2+(0)^2+(0)^2\}^{1/2}=30 \qquad \text{Equation 3}$$

Since the inner product of the two vectors is equal to the value resulting from multiplying the product of the lengths of the respective vectors with the cosine of the angle created by the vectors, equation 4 becomes viable.

[Math 2]

$$\cos\theta=300/(10\sqrt{5}\times30)=\sqrt{5}/5 \qquad \text{Equation 4}$$

Therefore, the secondary collision likelihood direction evaluation value (1+cos θ)/2, is as shown in math 3 below.

[Math 3]

$$(1+\sqrt{5}/5)/2=(5+\sqrt{5})/10$$

The secondary collision likelihood distance evaluating unit 109 calculates the secondary collision likelihood distance evaluation value of the object specified as secondary collision candidate object, and outputs the calculation result to the path evaluating unit 113 (step S707).

Specifically, in the case of FIG. 3, when the "cake" is the secondary collision candidate object, the distance between the position (50, 15, 0) of the "cake" and the position (40, 35, 0) of the "garlic" is the square root of the sum of (50−40) raised to the power of 2 and (15−35) raised to the power of 2, that is, $\{(50-40)^2+(15-35)^2\}^{1/2}$. In other words, it is as shown in math 4 below.

[Math 4]

$$10\sqrt{3}$$

Therefore, the secondary collision likelihood distance evaluation value is the value resulting from multiplying e with the expression shown in math 5 below.

[Math 5]

$$-10\sqrt{3}$$

In other words, it becomes the expression shown in math 6 below.

[Math 6]

$$e^{-10\sqrt{3}}$$

The risky attribute combination evaluating unit 112 calculates the risky attribute combination evaluation value of the secondary collision candidate object, and outputs this to the path evaluating unit 113 (step S709).

Specifically, in the case of FIG. 3, when the "cake" is the secondary collision candidate object, the "garlic" and the "cake" have a risky attribute combination evaluation value of "1" since they are included in the risky attribute combinations in FIG. 6.

When the "magnet" is the secondary collision candidate object, the "garlic" and the "magnet" have a risky attribute combination evaluation value of "0" since they are not included in the risky attribute combinations in FIG. 6.

The path evaluating unit 113 calculates the evaluation value of the secondary collision candidate object based on the secondary collision likelihood direction evaluation value calculated in the secondary collision likelihood direction evaluation process (step S706), the secondary collision likelihood distance evaluation value calculated in the secondary collision likelihood distance evaluation process (step S707), and the risky attribute combination evaluation value calculated in the risky attribute combination obtainment process (step S709). In other words, the path evaluating unit 113 calculates the damage risk in the case where a secondary collision occurs (step S710).

Specifically, in the case of FIG. 3, when the "cake" is the secondary collision candidate object, the evaluation value is calculated according to equation 5.

[Math 7]

$$(5+\sqrt{5})/10 \times e^{-10\sqrt{3}} \times 1 = (5+\sqrt{5}) \times e^{-10\sqrt{3}}/10 \qquad \text{Equation 5}$$

After the evaluation calculation process (step S710), the processing returns to the secondary collision candidate object judgment process (step S704), and the same processes are repeated for the remaining secondary collision candidate objects.

When there are no longer any objects that have not yet been obtained as a secondary collision candidate object (NO in step S704), the path evaluating unit 113 calculates a path evaluation value based on the respective candidate evaluations calculated in the evaluation calculation process (step S710). The calculated path evaluation value is stored in the evaluation holding unit 114 (step S711).

Specifically, in the case of FIG. 3, the path evaluating unit 113 obtains the path evaluation value by calculating the sum of the evaluation value when the "cake" is the secondary collision candidate object, shown in math 8 below, and the evaluation value 0 when the "magnet" is the secondary collision candidate object.

[Math 8]

$$(5+\sqrt{5}) \times e^{-10\sqrt{3}}/10$$

Here, the path evaluation value is as shown in math 9 below.

[Math 9]

$$(5+\sqrt{5}) \times e^{-10\sqrt{3}}/10$$

The behavior planning unit 115 obtains the path evaluation value from the evaluation holding unit 114, creates a behavior plan based on the obtained path evaluation value, and stores the information indicating the planned behavior in the plan holding unit 116 (step S712).

Specifically, in the case of FIG. 3, information indicating low speed as the movement speed of the robot 401 is stored when the path evaluation value shown in math 10 is larger than a predetermined value, and information indicating high speed is stored when the path evaluation value is equal to or lower than the predetermined value.

[Math 10]

$$(5+\sqrt{5}) \times e^{-10\sqrt{3}}/10$$

<First Modification>

Although the first embodiment describes the case where the robot position obtaining unit 101 obtains the robot position using GPS or image processing, other methods are also acceptable. For example, the robot position may be determined based on the initial position of the robot and the distance and direction the robot has been moved from the initial position up to the point in time where the behavior plan is started.

<Second Modification>

Although the first embodiment describes the case where the attribute information is information indicating the type of the object, the attribute information may be information concerning properties such as "strong smelling", "emitting magnetism", and so on.

For example, it is possible to have a case where the risky attribute combination information holding unit 111 holds a risky attribute combination "strong smelling, cake". In such a case, when the attribute information of "garlic", "ginger", and "horseradish" is "strong smelling", the fact that these are risky with respect to the "cake" can be expressed in a single risky attribute combination.

Furthermore, the attribute information in the risky attribute combination may be a higher concept than the attribute information assigned to an object.

For example, it is possible to have a case where the risky attribute combination information holding unit 111 holds a risky attribute combination "strong smelling, food item". In such a case, since "food item" is a higher attribute information of "cake" and "strawberry", the fact that these are risky with respect to a "strong smelling" object can be expressed in a single risky attribute combination.

<Third Modification>

Although the first embodiment describes the case where the attribute information is information indicating the type of the object, the attribute information may be information such as "susceptible to "magnetism"", "resistive to strong "smelling" objects", and so on.

<Fourth Modification>

In the first embodiment, since the size of the object to be grasped is not considered for the sake of simplicity, a path for moving up to the position of the object to be grasped is planned in the grasping of an object. However, since an object has size in actuality, a plan may be drawn up for stopping slightly short of the object to be grasped, in consideration of the object's size.

<Fifth Modification>

In the first embodiment, a case where there is an obstruction between two objects or the case where the two objects are not on the same planar surface, and so on, is not referred to in the consideration of a path between the robot and the object to be grasped.

When there is an obstruction, such as a wall, between the robot and the object to be grasped, each of plural directed line segments for avoiding the obstruction may be assumed as a path. In such a case, the path evaluating unit evaluates each path and the evaluation holding unit 114 holds the evaluation for the respective evaluations. The behavior planning unit 115 performs behavior planning for each path. The plan holding unit 116 holds the respective behavior plans. It should be noted that known techniques are used in the generation of paths in an environment which includes an obstruction.

<Sixth Modification>

The path evaluating unit 113 in the first embodiment assumes objects in the environment as candidates for secondary collision, calculates the damage risk for each candidate, and sets the path evaluation value as the total value thereof. However, the largest value in the damage risk may be assumed as the path evaluation value.

Furthermore, although the secondary collision likelihood direction evaluation value, the secondary collision likelihood distance evaluation value, and the risky attribute combination evaluation value are sequentially calculated in the first embodiment, it is also acceptable to have a configuration in which, when the respective values thereof are equal to or lower than a predetermined value, subsequent evaluation value calculation is omitted. By using such as a configuration, calculation time can be shortened.

Furthermore, it is also acceptable to have a configuration which calculates the risky attribute combination evaluation value first when there are many objects in the environment, and calculates the risky attribute combination evaluation value last when there are few objects. With such as a configuration, calculation time can be likewise shortened.

Furthermore, when the robot and the object to be grasped are not present in the same planar surface, paths made from plural directed line segments may be generated in the same manner as in the fifth modification, and evaluation and planning may be performed for each path.

It should be noted that it is also acceptable to form plural paths using the above-described method, and use the total distance of the plural paths in the calculation of the distance between the object to be grasped and neighboring objects performed by the secondary collision likelihood distance evaluating unit 109.

<Seventh Modification>

The secondary collision likelihood direction evaluating unit 108 and the secondary collision likelihood distance evaluating unit 109 in the first embodiment calculate the secondary collision likelihood direction evaluation value and the secondary collision likelihood distance evaluation value, respectively, without taking the size of the object into consideration. However, the secondary collision likelihood direction evaluation value and the secondary collision likelihood distance evaluation value may be calculated using equations that take the size of the object into consideration. This is because, when two objects are present at the same distance from the object to be grasped, an object having a greater size has a higher likelihood of causing a secondary collision. It should be noted that the size of the objects may be stored in the object position attribute holding unit 104.

Figure 8:
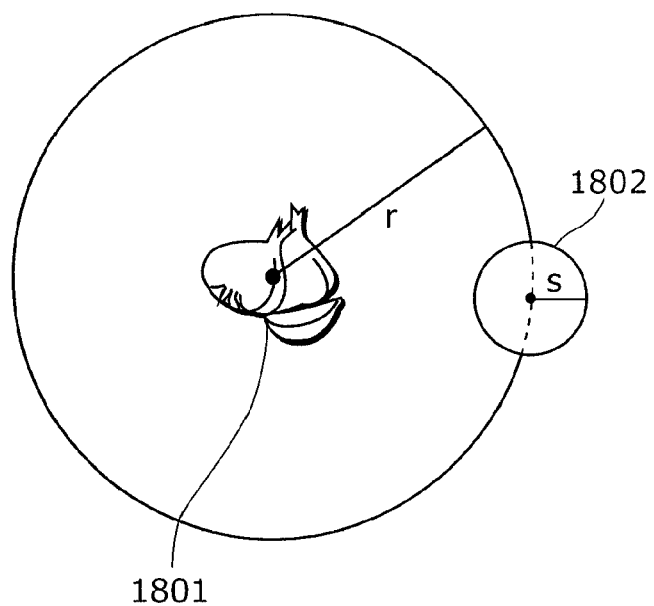
[FIG. 8]

The case where, for example, a neighboring object 1802 having a radius s is present at a distance of a radius r from an object to be grasped 1801, as shown in FIG. 8, shall be described. At this time, the circumferential length of the object to be grasped 1801 in the radius r is $2 \times n \times r$. Out of the circumference of the object to be grasped 1801, the neighboring object 1802 occupies a length of about $2 \times s$. Therefore, when the friction coefficient of a flat surface is disregarded, a secondary collision will occur with a probability of $s/(n \times r)$. Consequently, $s/(n \times r)$ may be adopted as the secondary collision likelihood distance evaluation value. Furthermore, when the relationship $s \geq r$ is satisfied, the neighboring object 1802 and the object to be grasped 1801 are in contact or are overlapping in terms of the value obtained by a sensor. As such, the probability that a secondary collision will occur may be assumed to be 1, regardless of the magnitude of the value of the secondary collision likelihood direction evaluation value. Specifically, when $s \geq r$, both the secondary collision likelihood direction evaluation value and the secondary collision likelihood distance evaluation value are 1.

It should be noted that, when the bottom surface of a neighboring object is not circular, circumradius S1 of the neighboring object is used in place of the radius s. Furthermore, such circumradius may be obtained by image processing or may be previously written into a tag assigned to the object and read using a tag reader at the time of behavior planning.

With such as a configuration, the likelihood of a secondary collision occurring can be predicted more accurately.

<Eighth Modification>

The secondary collision likelihood direction evaluating unit 108 and the secondary collision likelihood distance evaluating unit 109 in the first embodiment calculate the secondary collision likelihood direction evaluation value and the secondary collision likelihood distance evaluation value, respectively, without taking the size of a neighboring object into consideration. However, the secondary collision likelihood direction evaluating unit 108 and the secondary collision likelihood distance evaluating unit 109 may calculate the secondary collision likelihood direction evaluation value and the secondary collision likelihood distance evaluation value, respectively, using equations which take the size of a neighboring object into consideration. This is because, when two objects are present at the same distance from the object to be grasped, an object having a greater size has a higher likelihood of causing a secondary collision. It should be noted that the size of the objects may be stored in the object position attribute holding unit 104.

Figure 9:
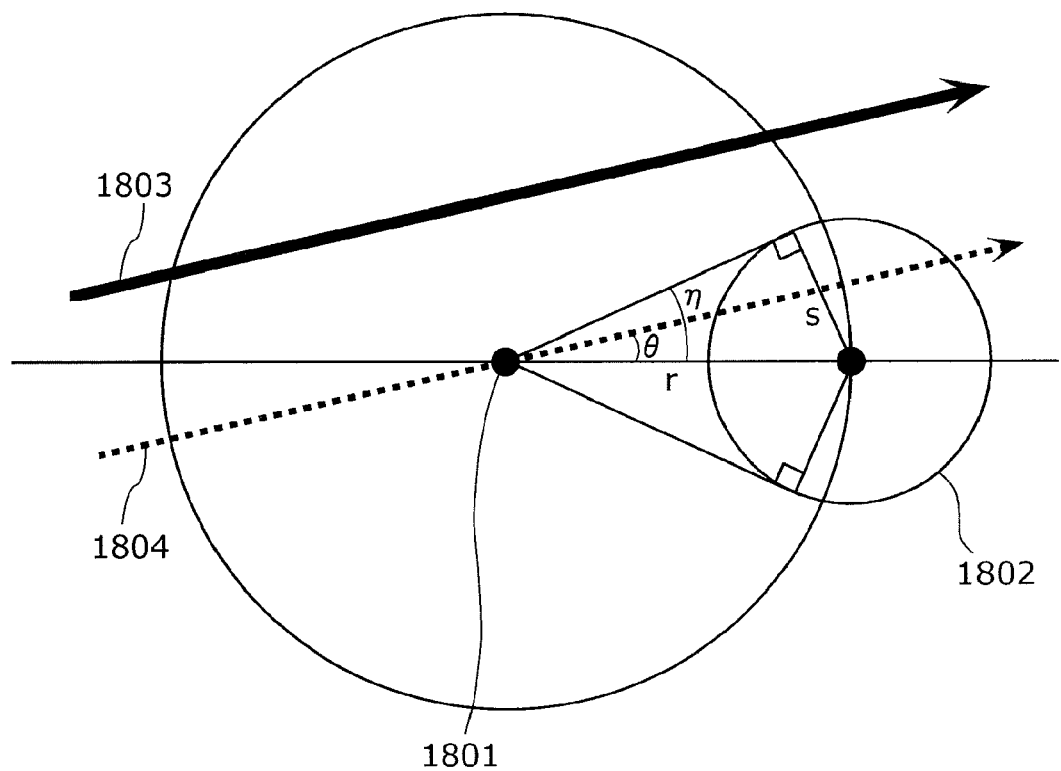
[FIG. 9]

The case where, for example, as shown in FIG. 9, the neighboring object 1802 having a radius s is present at a distance of a radius r from the object to be grasped 1801, and a movement path 1803 of the robot is defined as shown in the figure, shall be described. At this time, when the neighboring object 1802 is present on a straight line 1804 which passes through the center position of the object to be grasped 1801 and can be obtained by translation of the movement path 1803, secondary collision between the object to be grasped 1801 and the neighboring object 1802 is likely to occur. Here, the angle created by the straight line connecting the respective centers of the object to be grasped 1801 and the neighboring object 1802 and the straight line 1804 is assumed to be θ. Furthermore, the angle created by the straight line connecting the respective centers of the object to be grasped 1801 and the neighboring object 1802 and the tangent line of the circumscribed circle of the neighboring object 1802 which passes through the object to be grasped 1801 is assumed to be η. In other words, the tangent line of the circumscribed circle of the neighboring object 1802 which passes through the object to be grasped 1801 denotes the boundary for whether or not the object to be grasped 1801 will collide with the neighboring object 1802, and η denotes the boundary angle. It should be noted that η is calculated according to the equation below.

$$\eta = \arcsin\{s/r\}$$

At this time, the above-described case where secondary collision is likely to occur can be considered as the case where the relationship $-\eta < |\theta| < \eta$ is satisfied. Specifically, in a case where the relationship $-\eta < |\theta| < \eta$ is satisfied, the secondary collision likelihood direction evaluation value is 1.

Furthermore, since the neighboring object 1802 and the object to be grasped 1801 are in contact or are overlapping in terms of the value obtained by a sensor when the relationship $s \geq r$ is satisfied, the probability that secondary collision will occur may be assumed to be 1. Specifically, when $s \geq r$, both the secondary collision likelihood direction evaluation value and the secondary collision likelihood distance evaluation value are 1.

<Ninth Modification>

The secondary collision likelihood direction evaluating unit 108 and the secondary collision likelihood distance evaluating unit 109 in the first embodiment calculate the secondary collision likelihood direction evaluation value and the secondary collision likelihood distance evaluation value, respectively, without taking the size of the object to be grasped and the size of a neighboring object into consideration. However, the secondary collision likelihood direction evaluating unit 108 and the secondary collision likelihood distance evaluating unit 109 may calculate the secondary collision likelihood direction evaluation value and the secondary collision likelihood distance evaluation value, respectively, using equations which take the size of both objects into consideration. This is because, when two objects are present at the same distance from the object to be grasped, an object having a greater size has a higher likelihood of causing a secondary collision, and in addition, the greater the size of the object to be grasped, the higher the likelihood that it will cause a secondary collision. It should be noted that the size of the objects may be stored in the object position attribute holding unit 104.

Figure 10:
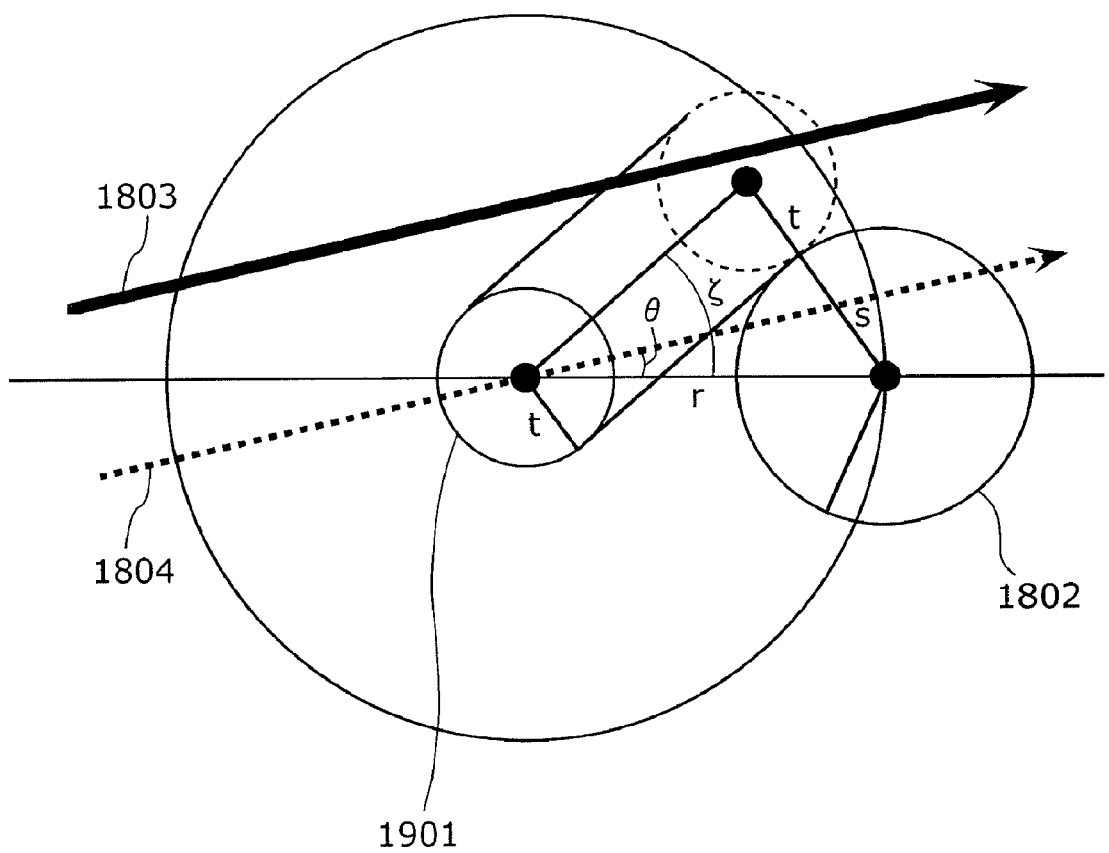
[FIG. 10]

The case where, for example, the circumradius of an object to be grasped 1901 is t, the circumradius of the neighboring object 1802 is s, and the distance between the center of the object to be grasped 1901 and the neighboring object 1802 is r, as shown in FIG. 10, shall be described. Furthermore, the movement path 1803 of the robot is as defined in the figure. At this time, the tangent line shared by the object to be grasped 1901 and the neighboring object 1802 denotes the boundary line for whether or not the object to be grasped 1901 will collide with the neighboring object 1802. Furthermore, the angle ζ created by such tangent line and the straight line connecting the respective centers of the object to be grasped 1901 and the neighboring object 1802 denotes the boundary angle. It should be noted that ζ is calculated according to the equation below.

$$\zeta = \arcsin\{(s+t)/r\}$$

Furthermore, the angle created by the straight line connecting the respective centers of the object to be grasped 1901 and the neighboring object 1802 and the straight line 1804 which passes through the center position of the object to be grasped 1901 and can be obtained by translation of the movement path 1803 is assumed to be θ.

Specifically, in the case where the relationship $-\zeta < \theta < \zeta$ is satisfied, it is considered that the object to be grasped 1901 and the neighboring object 1802 will collide, and thus the secondary collision likelihood direction evaluation value is 1.

Furthermore, when the relationship t+s>r is satisfied, a secondary collision is occurring in terms of the value obtained by a sensor. Therefore, both the secondary collision likelihood direction evaluation value and the secondary collision likelihood distance evaluation value are 1.

Advantageous Effect of the First Embodiment

As described above, according to the first embodiment, for a robot moving in a household environment, in addition to primary damage caused by the moving robot coming into contact with or coming close to an object, it is possible to judge whether or not secondary damage will be created when the object further comes into contact with a neighboring object. With this, behavior planning for the moving robot can be performed. Accordingly, secondary damage can be reduced.

In particular, in the first embodiment, robot behavior planning which avoids damage risk when the damage risk due to secondary collision is high based on the positional relationship between the path and objects or the type of the objects, is performed. Since it is possible to cause the robot to move at high speed when the damage risk is low, task performance time can be reduced. Furthermore, by causing the robot to move at high speed, the time for which electric power is supplied to the robot decreases and thus energy cost can be reduced. Furthermore, when the damage risk due to secondary collision is low, it is possible to cause the robot to move at high speed and avoid having the robot move at low speed at all times, and thus unnecessary irritation is not imparted to a person observing the movement of the robot. When the person observing the operation of a robot feels irritated, the person will move the object by himself. With this, although the energy cost used in the robot transporting an object midway is wasted, irritation can be avoided, and thus the advantageous effect is significant.

Second Embodiment

In a second embodiment, a robot system 805 in which behavior is executed according to the behavior planning apparatus 100 in the first embodiment shall be described.

Figure 11:
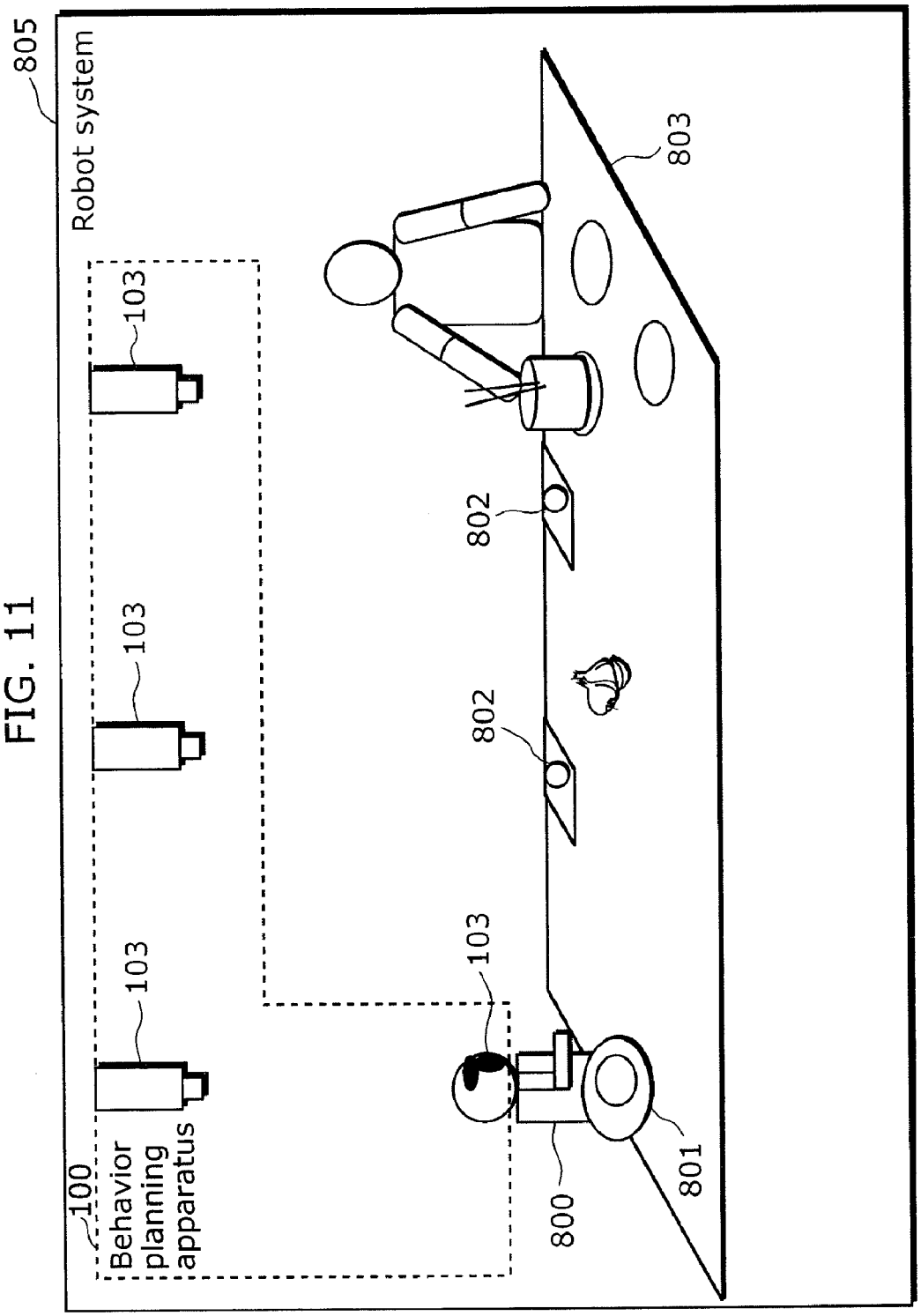
[FIG. 11]

FIG. 11 is a diagram showing the robot system 805. The robot system 805 is a robot system which assists the cooking tasks of the user. The robot system 805 includes a work table 803, a robot 800 which moves on the work table 803, and a behavior change instruction device 802 used when the user instructs an emergency stop or a change of tasks to the robot 800.

The robot 800 is a robot which moves on top of the work table 803, grasps an object instructed by the user, and transports the grasped object to the location of the user.

The robot 800 includes the behavior planning apparatus 100 and a movement device 801. The behavior planning apparatus 100 plans the behavior described in the first embodiment. Specifically, the behavior planning apparatus 100 plans a behavior for moving on top of the work table 803 in order to grasp the object instructed by the user. The behavior planning apparatus 100 is provided inside the robot 800.

The movement device 801 is a device for moving the robot 800 according to the behavior plan planned by the behavior planning apparatus 100.

Plural object position attribute obtaining units 103, which are a part of the behavior planning apparatus 100, are processing units which obtain object position attribute information of objects on the work table 803. Part of the object position attribute obtaining units 103 are fastened to the environment, and do not move using the movement device 801.

In such a configuration, the behavior planning apparatus 100 draws up the same behavior plan as in the first embodiment, and the robot 800 executes a behavior according to the behavior plan. It should be noted that through the user's operation of the behavior change instruction device 802, it is possible to cause the robot to make an emergency stop, to change the object to be grasped, and so on.

Advantageous Effect

According to the second embodiment, it is possible to cause the robot to move at low speed when the secondary collision damage risk is high. Therefore, it takes more time for the robot to reach the object to be grasped than when moving at high speed. As such, even when the robot is moving on a risky path in which it is likely to have a secondary collision, this can be noticed by the user and the robot can be stopped using the behavior change instruction device 802.

In particular, since judging a risky situation in a short time is difficult when the user is an elderly person, the advantageous effect of being able to take a long time up to the judgment is significant.

Furthermore, there are cases where the user is performing a cooking task and cannot immediately operate the behavior change instruction device 802. In such an event, the user is able to recognize how much temporal leeway there is until an emergency stop instruction must be given, just by looking at how close a position to the object to be grasped the robot has gotten. Therefore, for example, in the case where the user's hands are dirty, it is possible to select whether to push an emergency stop button provided on the behavior change instruction device 802 after washing hands or to push the emergency stop button in the user's current state, and thus the advantageous effect is significant.

Third Embodiment

In a third embodiment, a behavior planning apparatus 100*a* which performs the behavior planning of a robot arm shall be described.

Figure 12:
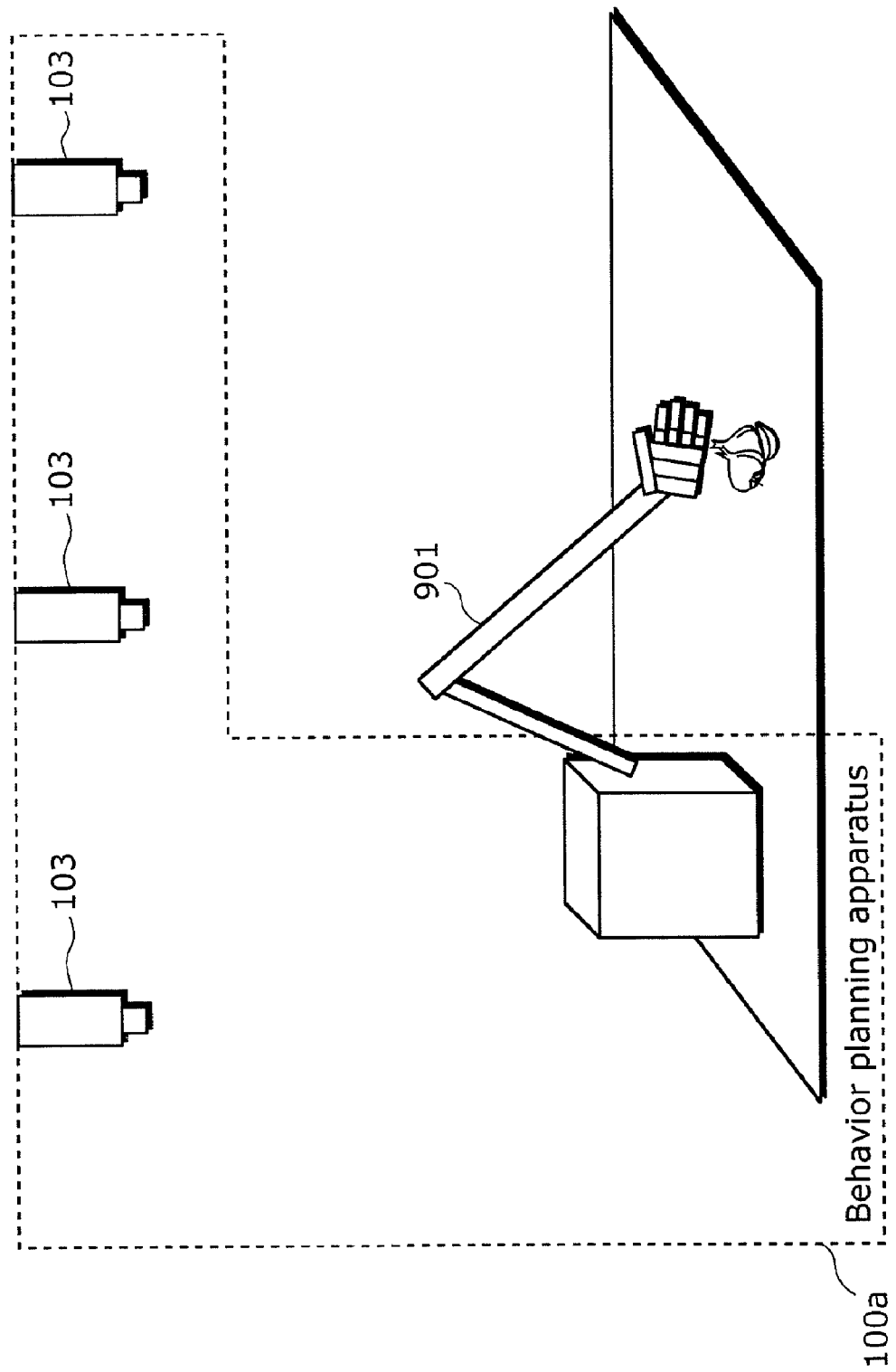
[FIG. 12]

FIG. 12 is a diagram showing a robot arm 901. The robot arm 901 controls the joints of the robot arm 901 to move the robot arm, based on the behavior planned by the behavior planning apparatus 100*a*. In the case of an articulated robot arm 901, each joint of the arm moves to a different position. Assuming each joint, and so on, as a representative point of the robot arm 901, the behavior planning apparatus 100*a* calculates the damage risk for each representative point and uses the total thereof as the sum total of damage risk.

Figure 13:
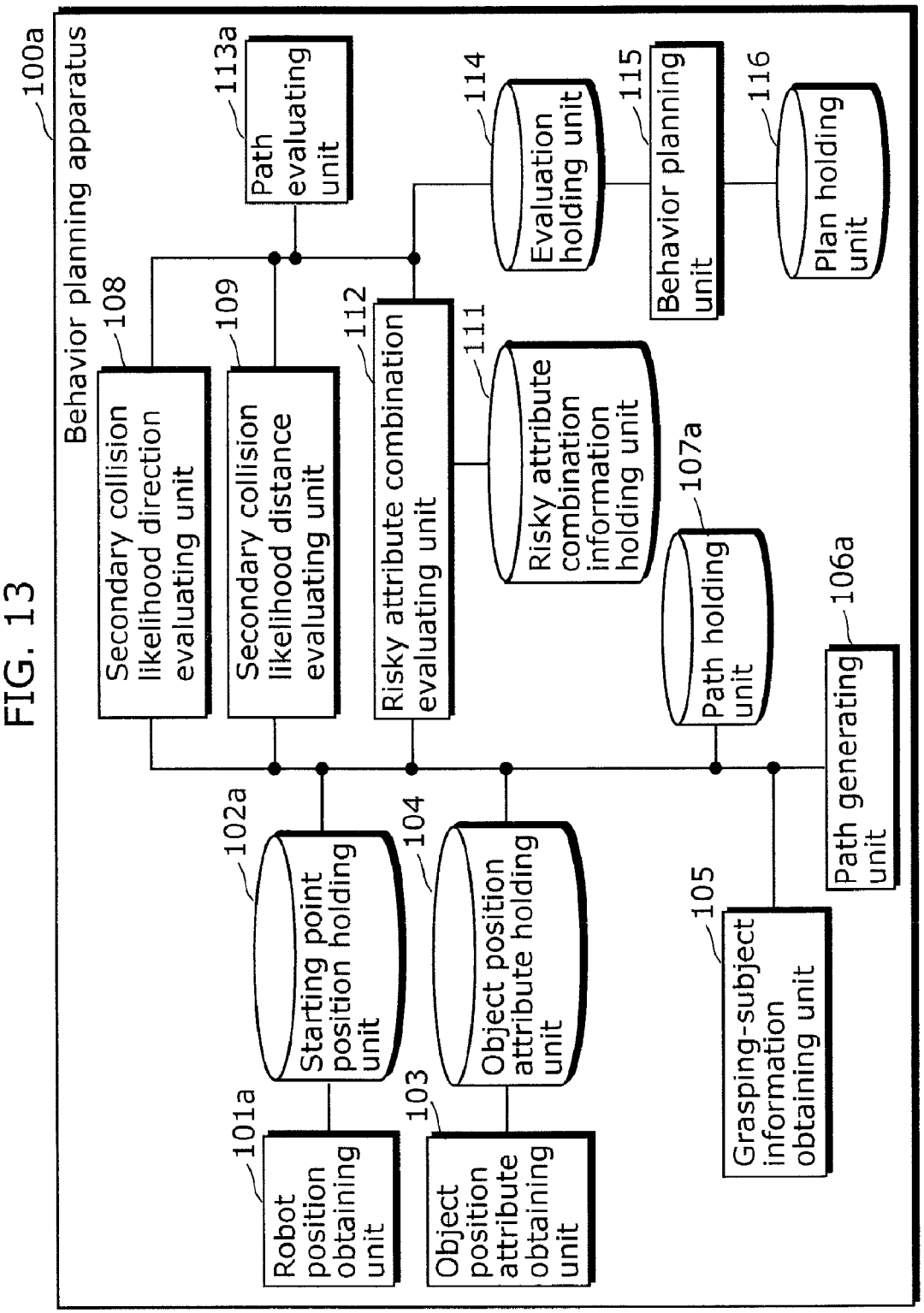
[FIG. 13]

FIG. 13 is a block diagram showing the configuration of the behavior planning apparatus 100*a* in the third embodiment.

The differences between the behavior planning apparatus 100*a* and the behavior planning apparatus 100 in the first embodiment shall be described hereafter. The behavior planning apparatus 100*a* uses, in place of the robot position obtaining unit 101, the starting point position holding unit 102, the path generating unit 106, the path holding unit 107, and the path evaluating unit 113 in the behavior planning apparatus 100, a robot position obtaining unit 101*a*, a starting point position holding unit 102*a*, a path generating unit 106*a*, a path holding unit 107*a*, and a path evaluating unit 113*a*, respectively. The rest of the configuration is the same as with the behavior planning apparatus 100. It should be noted that it is assumed that part of plural object position attribute obtaining units 103 are fastened to the environment.

The robot position obtaining unit 101*a* is a processing unit which obtains the position of each representative point of the robot arm, and stores the obtained representative point positions in the starting point position holding unit 102. The obtainment method is the same as the robot position obtainment method performed by the robot position obtaining unit 101 in the first embodiment. The representative points of the robot arm 901 are assumed to be the positions of the tip and the respective joints of the robot arm 901.

The starting point position holding unit 102*a* is a storage device for storing the position of each representative point of the robot arm 901 obtained by the robot position obtaining unit 101*a*, and is configured of an HDD and so on, for example.

The path generating unit 106*a* is a processing unit which generates a path for moving the representative point of the tip of the robot arm 901 to the position of the object to be grasped. Specifically, for example, the path is assumed to be the directed line segment having the representative point of the tip of the robot arm 901 as a starting point and the position at which the object to be grasped is located as an ending point. In addition, the path generating unit 106*a* generates a path for the representative points other than the representative point of the tip of the robot arm 901. Known methods regarding the moving of articulated robot arms are utilized in the generation of paths.

The path holding unit 107*a* is a storage device which holds the set of the paths for the respective representative points generated by the path generating unit 106*a*, and is configured using, for example, an HDD and so on.

The path evaluating unit 113*a* calculates the damage risk in the case where the robot arm 901 moves according to the set of paths held by the path holding unit 107*a*. Whereas the path evaluating unit 113 calculates one evaluation value for one path, with the path evaluating unit 113*a*, there is the difference that one evaluation value is calculated for a set of paths. Specifically, with the path evaluating unit 113*a*, a path evaluation value (damage risk) is calculated for each representative point path, using the same method as with the path evaluating unit 113, and the total thereof is assumed to be the evaluation value for the set of the paths. The path evaluating unit 113*a* stores the calculated path evaluation value in the evaluation holding unit 114.

It should be noted that, although the tip and the respective joints of the arm are adopted as representative points here, other positions may be assumed as representative points. Furthermore, the accuracy of the evaluation may be improved by adding intermediate points between the respective joints to the representative points or providing a representative point at predetermined intervals. At that time, by making the predetermined intervals smaller than the width of the neighboring object, the instances of overlooking a collision with the neighboring object is reduced.

In such a configuration, the behavior planning apparatus 100*a* draws up the same behavior plan as in the first embodiment, and the robot arm 901 executes the behavior according to the behavior plan.

Advantageous Effect

By using the configuration in the third embodiment, it is possible to draw up a behavior plan for avoiding damage due to secondary collision, even for a robot having plural joints.

Fourth Embodiment

The first embodiment describes a behavior planning apparatus which draws up a behavior plan for a robot with an assumption that a secondary collision will occur based on a primary collision between the robot and the object to be grasped. However, there are cases where the robot has a primary collision with an object on the movement path of the robot, other than the object to be grasped. This is because, in the same manner as in a collision with the object to be grasped, the position recognizing accuracy of a robot used in the household environment is low or the limitation on the time for executing a task is severe, and so on.

In a fourth embodiment, a behavior planning apparatus 100b which draws up a behavior plan for a robot, taking into consideration primary collision with an object other than the object to be grasped as described above shall be described.

<Perspective on Avoiding Damage Due to Secondary Collision in Movement Behavior>

The first embodiment describes behavior planning for the case where the object to be grasped and the robot have a primary collision and a secondary collision occurs. When the robot moves, there is a possibility that an object present on the movement path and the robot will have a primary collision. In addition, when there is inaccuracy in the position recognition or controlling of the robot, the robot also can also have a primary collision with an object which the robot recognizes as not being present in the movement path. Consequently, the behavior planning apparatus 100b in the fourth embodiment assumes objects in the environment as candidates for primary collision with the robot, and evaluates that primary collision with the robot is more likely to occur for an object that is (recognized by the robot as being) at a closer distance from the movement path of the robot. Furthermore, the behavior planning apparatus 100b evaluates that primary collision with the robot is less likely to occur for an object that is at a farther distance. In addition, the behavior planning apparatus 100b further evaluates, for each of the candidates, whether or not a secondary collision is likely to occur and the degree of damage when a secondary collision does occur, assuming that the other objects in the environment are secondary collision candidates.

Specifically, the behavior planning apparatus 100b calculates the damage risk in a secondary collision occurring between an object assumed as a primary collision candidate and an object assumed as a secondary collision candidate, by defining such damage risk as the product of the likelihood of a primary collision, the likelihood of a secondary collision, and the degree of damage in the case where secondary collision occurs. Accordingly, when the calculated damage risk is higher than a predetermined value, behavior which avoids secondary collision is planned.

<Behavior Planning Apparatus>

Figure 14:
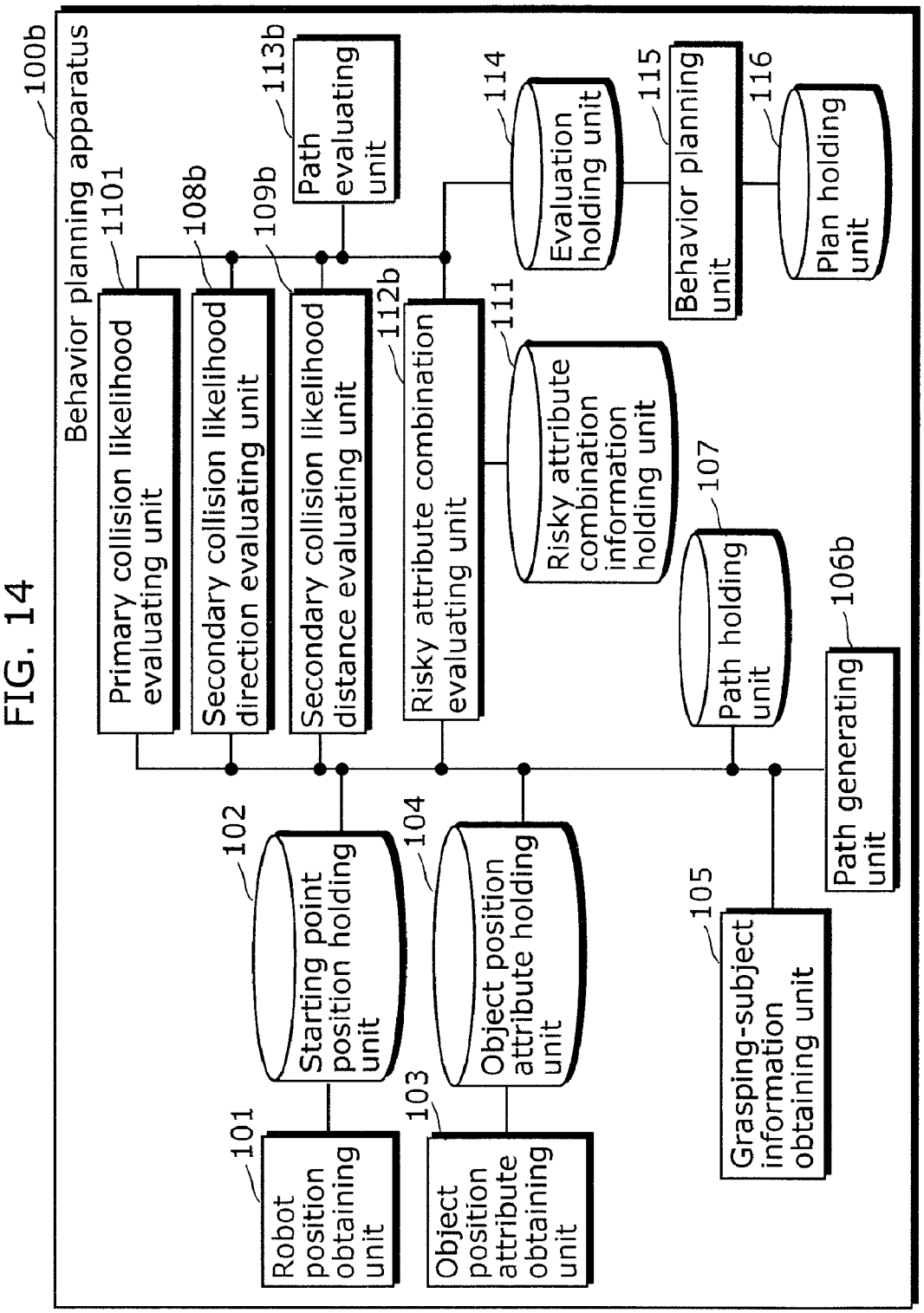
[FIG. 14]

FIG. 14 is a block diagram showing the configuration of the behavior planning apparatus 100b in the fourth embodiment.

The differences between the behavior planning apparatus 100b and the behavior planning apparatus 100 in the first embodiment shall be described hereafter. The behavior planning apparatus 100b uses, in place of the path generating unit 106, the secondary collision likelihood direction evaluating unit 108, the secondary collision likelihood distance evaluating unit 109, the risky attribute combination evaluating unit 112, and the path evaluating unit 113 in the behavior planning apparatus 100, a path generating unit 106b, a secondary collision likelihood direction evaluating unit 108b, a secondary collision likelihood distance evaluating unit 109b, a risky attribute combination evaluating unit 112b, and a path evaluating unit 113b, respectively. In addition, the behavior planning apparatus 100b includes a primary collision likelihood evaluating unit 1101.

The path generating unit 106b is a processing unit which obtains, from outside the apparatus, the movement destination of the robot, and generates a path. The path generating unit 106b includes, for example, an input device not shown in the figure, and obtains three-dimensional coordinates inputted by the user, as the movement destination. The path generating unit 106 assumes, as the route, a directed line segment having the robot position which is the starting point of the movement path of the robot held by the starting point position holding unit 102 as a starting point and the obtained movement destination as an ending point.

The secondary collision likelihood direction evaluating unit 108b is a processing unit which evaluates how collision-prone the direction of a specified secondary collision candidate object is with respect to a specified primary collision candidate object. The secondary collision likelihood direction evaluating unit 108b is different in using a primary collision candidate object in place of the object to be grasped in the secondary collision likelihood direction evaluating unit 108.

The secondary collision likelihood distance evaluating unit 109b is a processing unit which evaluates how collision-prone the distance of a specified secondary collision candidate object is with respect to a specified primary collision candidate object. The secondary collision likelihood distance evaluating unit 109b is different in using a primary collision candidate object in place of the object to be grasped in the secondary collision likelihood distance evaluating unit 109.

The risky attribute combination evaluating unit 112b is a processing unit which evaluates whether the specified secondary collision candidate object is a risky object with respect to the specified primary collision candidate object. The risky attribute combination evaluating unit 112b is different in using a primary collision candidate object in place of the object to be grasped in the risky attribute combination evaluating unit 112.

The primary collision likelihood evaluating unit 1101 is a processing unit which evaluates how collision-prone the position of the specified primary candidate object is with respect to the movement path of the robot. In the subsequent description, this evaluation shall be called "primary collision likelihood evaluation", and the evaluation value calculated at that time shall be called "primary collision likelihood evaluation value". The primary collision evaluation is the evaluation of the tendency of the occurrence of a primary collision described in the aforementioned <Perspective on Avoiding Damage Due to Secondary Collision in Movement Behavior>.

With the primary collision likelihood evaluating unit 1101, the distance between the movement path of the robot and the specified object is assumed as r3 and the Euler number e raised to −r3 ($e^{-r3}$) is assumed as the primary collision evaluation value. In the case where such an evaluation is performed, when the distance is 0, the primary collision likelihood evaluation value becomes a largest value 1, and when the distance is infinity, the primary collision likelihood evaluation value becomes a smallest value 0. Specifically, the primary collision likelihood evaluation value becomes a value approaching 1, which is the largest value, as the specified object is at a closer distance which is more prone to collision with the path, and becomes a value approaching 0, which is the smallest value, as the specified object is at a farther distance which is less prone to collision. Here, the equation for the primary collision likelihood evaluation may be another equation as long as it is an equation in which the value becomes smaller as the distance increases. Furthermore, it may also be an equation that follows model that takes into consideration the error appearance property of the sensor.

The path evaluating unit 113b is a processing unit which evaluates damage risk due to secondary collision in the case where the robot moves in the path held by the path holding unit 107. The path evaluating unit 113b performs damage risk evaluation following the perspective described in the aforementioned <Perspective on Avoiding Damage Due to Secondary Collision in Movement Behavior>.

<Process Flow>

Figure 15:
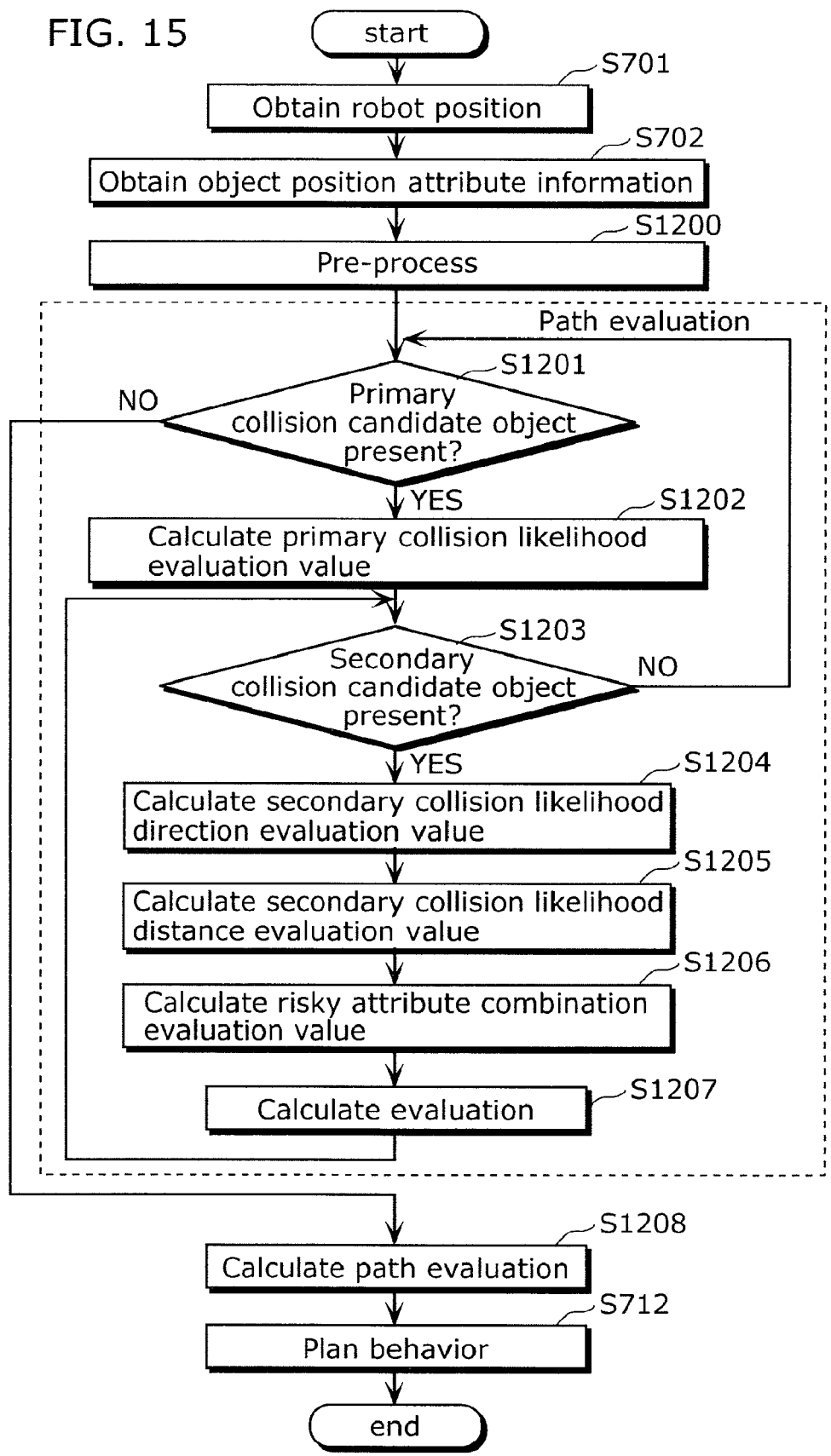
[FIG. 15]

The flow of the behavior planning performed by the behavior planning apparatus 100b is shown in FIG. 15.

The robot position obtaining unit 101 obtains the robot position, and stores this in the starting point position holding unit 102 (step S701). Furthermore, the object position attribute obtaining unit 103 obtains the object position attribute information of objects that are present in the environment, and stores these in the object position attribute holding unit 104 (step S702). The robot position obtainment process (step S701) and the object position attribute information obtainment process (step S702) are the same as those described in the first embodiment.

The path evaluating unit 113b assumes the value of the variable for evaluation storing to be 0 (step S1200).

The path evaluating unit 113b judges whether or not there are objects not obtained as a primary collision candidate object, among the objects corresponding to the attribute information held by the object position attribute holding unit 104 (step S1201). When there are objects that have not yet been obtained as a primary collision candidate object (YES in step S1201), the path evaluating unit 113b arbitrarily selects one of the not-yet-selected objects. The primary collision likelihood evaluating unit 1101 outputs the primary collision likelihood evaluation value for the selected primary collision candidate object (step S1202).

The path evaluating unit 113b judges whether or not there are objects not obtained as a secondary collision candidate object, among the objects corresponding to the attribute information held by the object position attribute holding unit 104 other than the primary collision candidate object (step S1203). When there are objects that have not yet been obtained as a secondary collision candidate object (YES in step S1203), the path evaluating unit 113b arbitrarily selects one of the not-yet-selected objects, and sets the selected object as a secondary collision candidate object.

The secondary collision likelihood direction evaluating unit 108b calculates the secondary collision likelihood direction evaluation value indicating the likelihood of a secondary collision between the primary collision candidate object and the secondary collision candidate object (step S1204).

Furthermore, the secondary collision likelihood distance evaluating unit 109b calculates the secondary collision likelihood distance evaluation value indicating the likelihood of a secondary collision between the primary collision candidate object and the secondary collision candidate object (step S1205).

In addition, the risky attribute combination evaluating unit 112b calculates the risky attribute combination evaluation value indicating the likelihood of damage being created in the case where the primary collision candidate object and the secondary collision candidate object have a secondary collision (step S1206).

The secondary collision likelihood direction evaluation process (step S1204), the secondary collision likelihood distance evaluation process (step S1205), and the risky attribute combination obtainment process (step S1206) are the same as the secondary collision likelihood direction evaluation process (step S706), the secondary collision likelihood distance evaluation process (step S707), and the risky attribute combination obtainment process (step S709), respectively, shown in the first embodiment. However, they are different in using the primary collision candidate object in place of the object to be grasped.

The path evaluating unit 113b calculates the damage risk for the combination of the primary collision candidate object and the secondary collision candidate object, and stores the result of adding the calculation result and the value of the variable for evaluation storing in the variable for evaluation storing (step S1207). It should be noted that the damage risk is assumed to be (secondary collision likelihood direction evaluation value)×(secondary collision likelihood distance evaluation value)×(primary collision likelihood evaluation value)×(risky attribute combination evaluation value).

After the evaluation calculation process (step S1207), the processing returns to the secondary collision candidate object judgment process (step S1203), and the same processes are repeated for the remaining secondary collision candidate objects.

Furthermore, when there are no more secondary collision candidate objects (NO in step S1203), the process returns to the primary collision candidate object judgment step (step S1201), and the same processes are also repeated for the remaining primary collision candidate objects. It should be noted that, every time the primary collision candidate object changes, all the other objects are reset to the not-yet-obtained state in terms of being a secondary collision candidate object.

After the damage risk is calculated for all the combinations of the primary collision candidate objects and the secondary collision candidate objects (NO in step S1201), the path evaluating unit 113b sets the value stored in the variable for evaluation storing as the path evaluation value, and stores this in the evaluation holding unit 114 (step S1208).

The behavior planning unit 115 obtains the path evaluation value from the evaluation holding unit 114, creates a behavior plan based on the obtained path evaluation value, and stores the information indicating the planned behavior in the plan holding unit 116 (step S712), as in the first embodiment.

<First Modification>

The fourth embodiment describes a method of evaluating the risk of a path by calculating the damage risk in a secondary collision between a first object, which is on the movement path of the robot, and a second object in the neighborhood thereof. In addition, the fourth embodiment describes behavior planning for planning the movement speed of the robot in the vicinity of the first object, based on damage risk.

However, the processes performed based on the evaluation of the damage risk is not limited to these, and may include other processes. For example, it is acceptable to have a configuration where, when the calculated damage risk is higher than a predetermined threshold value, the name of the first object is outputted as speech, using a speech outputting device not shown in the Drawings, so as to notify the user to move the first object.

Normally, when a robot which performs cleaning cleans a room it is necessary for a person to take out many of the objects in the room beforehand. However, with the above-described configuration, the number of objects to be taken out can be reduced. As such, the advantageous effect of reducing the burden on a person at the time of cleaning is produced. Furthermore, even in a case where the robot grasps an object inside a refrigerator, the same advantageous effect can also be produced by performing the same process to notify the user of the objects that must be taken out beforehand.

Advantageous Effect

In the configuration in the fourth embodiment, it is possible to reduce damage risk even for a primary collision occurring due to the collision between an object on the movement path of the robot and the robot, and thus the advantageous effect thereof is significant.

Fifth Embodiment

The fourth embodiment shows the behavior planning apparatus 100b which plans behavior for moving at low speed when the damage risk in a secondary collision is high. However, there are cases where secondary collision cannot be avoided just by moving at low speed. In a fifth embodiment, a behavior planning apparatus 100c which plans a different movement path when the damage risk in a secondary collision is high shall be described.

<Perspective on the Different Path Planning>

Figure 16:
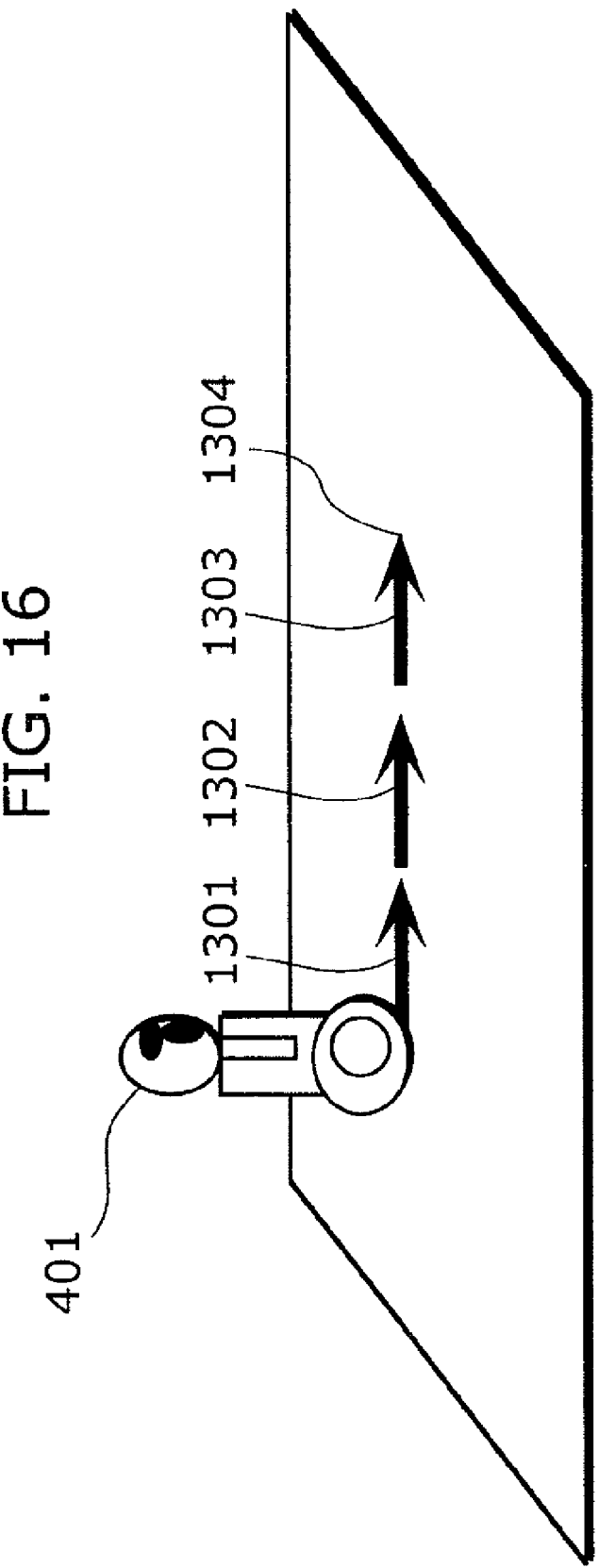
[FIG. 16]

The behavior planning apparatus 100c in the fifth embodiment plans the path on which the robot moves to the movement destination as a collection of plural paths. FIG. 16 is a diagram showing an example of the case of planning the movement path of the robot 401 as the path group made from three paths (paths 1301, 1302, and 1303) when the robot 401 at position (10, 35, 0) moves to a movement destination 1304 at position (40, 35, 0).

The behavior planning apparatus 100c calculates the damage risk for the respective planned paths and, when there is a path with a high damage risk, plans a new different path which does not pass that through that portion.

Figure 17:
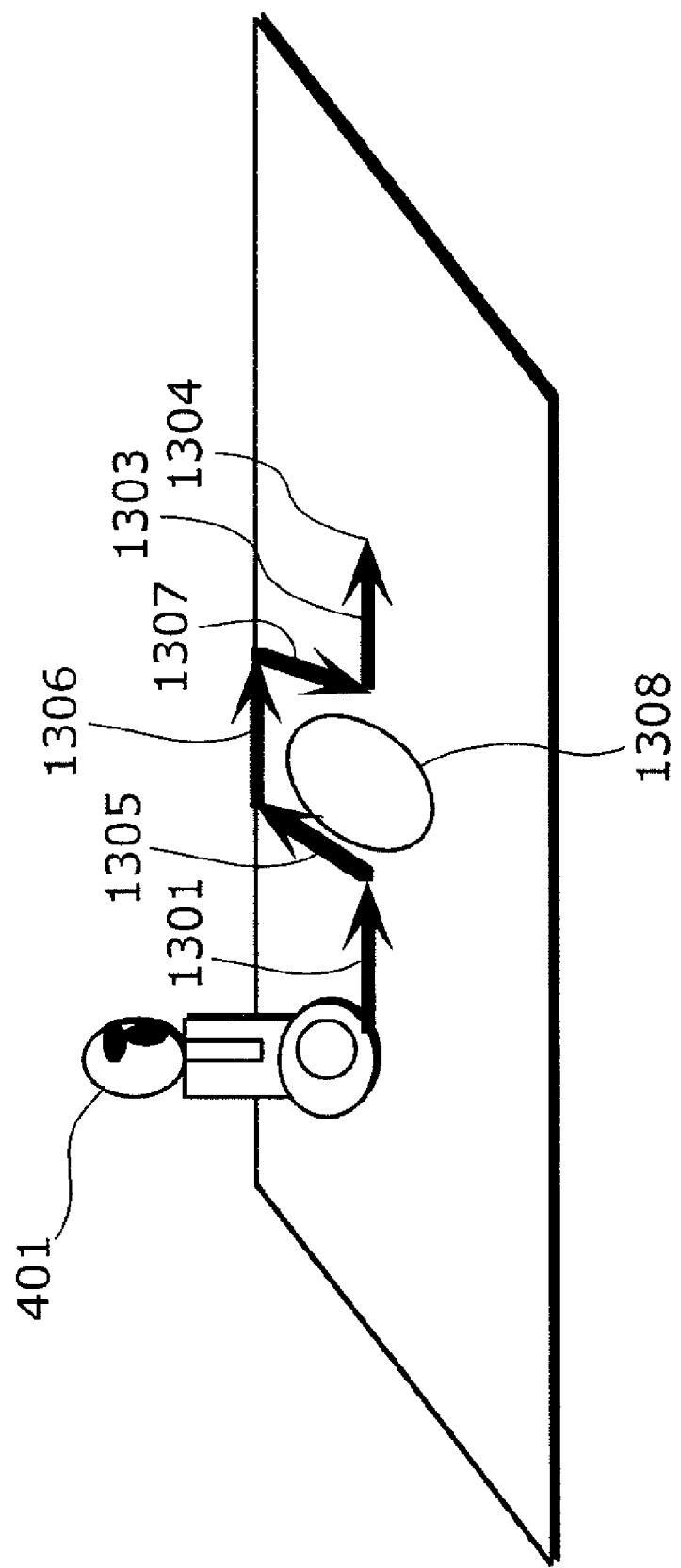
[FIG. 17]

For example, assume that the damage risk for the path 1302 in FIG. 16 is higher than a predetermined value. At this time, the behavior planning apparatus 100c plans a new different path as shown in FIG. 17. Specifically, the behavior planning apparatus 100c assumes, for example, that an obstruction 1308 is present in the position of the path 1302 in FIG. 16, and generates a different path using the conventionally available method of generating a path in an environment in which obstructions are present. Specifically, the behavior planning apparatus 100c performs path generation for the case where an obstruction 1308, such as a wall, is present, and sets the generated path as a different path. In the example shown in FIG. 17 paths 1301, 1305, 1306, 1307, and 1303 are generated as the different path.

The behavior planning apparatus 100c also evaluates the newly generated different path for whether or not a path with a high secondary collision damage risk is present and, when present, further generates a different path which excludes such portion.

<Behavior Planning Apparatus>

Figure 18:
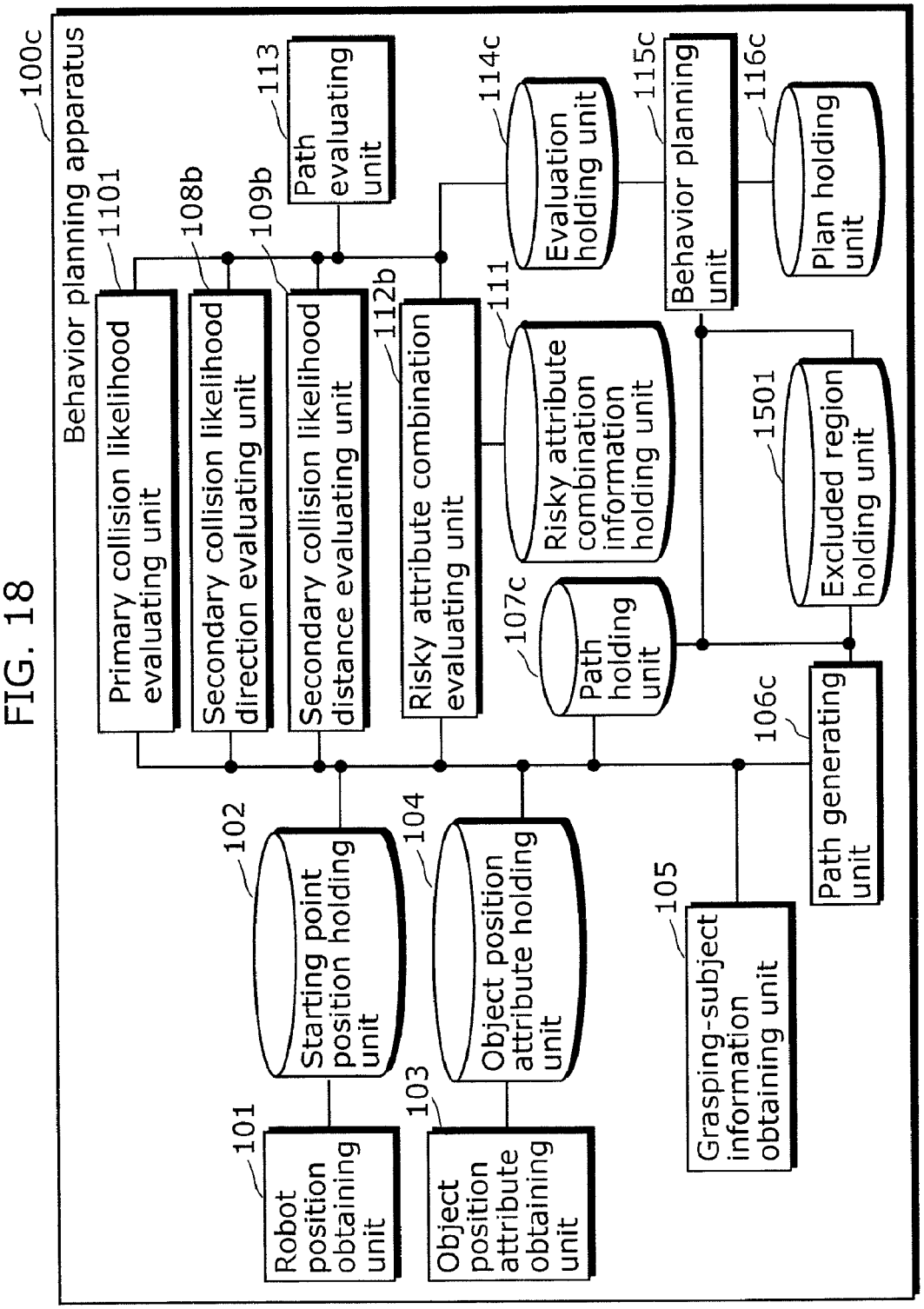
[FIG. 18]

FIG. 18 is a block diagram showing the configuration of the behavior planning apparatus 100c in the fifth embodiment.

The differences between the behavior planning apparatus 100c and the behavior planning apparatus 100b in the fourth embodiment shall be described hereafter. The behavior planning apparatus 100c uses, in place of the path generating unit 106b, the path holding unit 107, the evaluation holding unit 114, the behavior planning unit 115, and the plan holding unit 116 in the behavior planning apparatus 100b, a path generating unit 106c, the path holding unit 107c, a evaluation holding unit 114c, a behavior planning unit 115c, and a plan holding unit 116c, respectively. In addition, the behavior planning apparatus 100c uses an excluded region holding unit 1501.

The excluded region holding unit 1501 is a storage device which holds a region that is excluded in the generation of a path, and is configured using an HDD and so on. In the initial state, nothing is stored in the excluded region holding unit 1501.

The path generating unit 106c is a processing unit which obtains, from outside the apparatus, the movement destination of the robot, and generates a path. The path generating unit 106c includes, for example, an input device not shown in the figure, and obtains three-dimensional coordinates inputted by the user, as the movement destination. Whereas the path generating unit 106b in the fourth embodiment generates one path, the path generating unit 106c generates a path group made from plural directed line segments. In the generation of paths by the path generating unit 106c, path generation is performed under the assumption that an obstruction is present in a region held by the excluded region holding unit 1501.

The path holding unit 107c is a storage device which holds the paths generated by the path generating unit 106c, and is configured using, for example, an HDD and so on.

The evaluation holding unit 114c is a storage device which holds, as a path evaluation value, the evaluations calculated by the path evaluating unit 113 as the damage risk for the respective paths, and is configured of an HDD and the like, for example. Whereas the evaluation holding unit 114 in the fourth embodiment holds one evaluation, the evaluation holding unit 114c holds the evaluations for the respective paths held by the path holding unit 107c.

The behavior planning unit 115c judges whether a path evaluation value that equal to or higher than a predetermined value is present among the path evaluation values held by the evaluation holding unit 114c. When there is a path evaluation value equal to or higher than the predetermined value, the behavior planning unit 115c obtains the path corresponding to such path evaluation value from the path holding unit 107c. Furthermore, the behavior planning unit 115c adds a circular (or a spherical, cylindrical) region having the starting point and the ending point of the obtained path as diameter, as an excluded region, to the excluded region holding unit 1501. When the excluded region is added, a new path is generated, and path evaluation is performed again by the path evaluating unit 113. When there is no path evaluation value equal to or higher than the predetermined value, the behavior planning unit 115c outputs the path group held by the path holding unit 107c to the plan holding unit 116.

The plan holding unit 116c is a storage device which holds information indicating the behavior plan planned by the behavior planning unit 115c, and is configured of an HDD and so on, for example.

In such a configuration, the behavior planning apparatus 100c draws up the same behavior plan as in the fourth embodiment while changing the movement path of the robot, and the robot arm 901 executes the behavior according to the behavior plan.

<First Modification>

Although the path generating unit 106c in the fifth embodiment designs a path for the portion extending from the robot position to the movement destination as plural paths from the beginning, it need not be designed as plural paths when the portion allows for a path which is a single straight line. For example, it is also acceptable to calculate damage risk for the path as a single straight line and adopt the straight line as the path when the damage risk is lower than a predetermined value, and to design an improved path by breaking up the path into portions, finding out which portion of the path has a high damage risk, and excluding such portion, when the damage risk is higher than the predetermined value. By using such as a configuration, the calculation load for calculating damage risk can be reduced.

<Second Modification>

Although, the behavior planning unit 115*c* in the fifth embodiment adopts, as the excluded region, a circular (or spherical) region having the starting point and the ending point of the path as a diameter when the evaluation for a path is poor, other shapes are also acceptable. Specifically, when there are many paths with high damage risk, adopting a larger region for exclusion makes it possible to avoid having to remake an improved path several times.

Inversely, when there are few paths with high damage risk, adopting a smaller region allows the improved path to be relatively less circuitous.

Furthermore, the area of the region to be excluded may be determined based on the evaluation value of the path. For example, the area of the region to be excluded may be made large when the evaluation value for the path is big (that is, when the damage risk is high), and the area of the region to be excluded may be made small when the evaluation value for the path is small (that is, when the damage risk is low). By using such a configuration, in the case where the damage risk is low, it is possible to find a movement path with the shortest possible distance as compared to always excluding a large region. Inversely, when the damage risk is high, a path having low damage risk can be found in fewer attempts compared to always excluding a small region.

<Third Modification>

Although, in the fifth embodiment, a different path is planned with respect the behavior planning apparatus 100*b* shown in the fourth embodiment, a different path may be planned with respect to the behavior planning apparatus 100 shown in the first embodiment. Specifically, it is acceptable to have a configuration in which the primary collision likelihood evaluating unit 1101 is not provided, and the secondary collision likelihood direction evaluating unit 108, the secondary collision likelihood distance evaluating unit 109, and the risky attribute combination evaluating unit 112 are used in place of the secondary collision likelihood direction evaluating unit 108*b*, the secondary collision likelihood distance evaluating unit 109*b*, and the risky attribute combination evaluating unit 112*b*.

Advantageous Effect

With the configuration in the fifth embodiment, damage risk can be reduced by changing the movement path of the robot, and thus the advantageous effect thereof is significant.

Sixth Embodiment

The fourth embodiment shows the behavior planning apparatus 100*b* which plans behavior for moving at low speed when the damage risk in a secondary collision is high. However, there are cases where plural movement paths are assumed in the execution of a task by the robot. A sixth embodiment shall describe a behavior planning apparatus 100*d* which selects, from among plural behavior plans, a behavior having low secondary collision damage risk.

Figure 19:
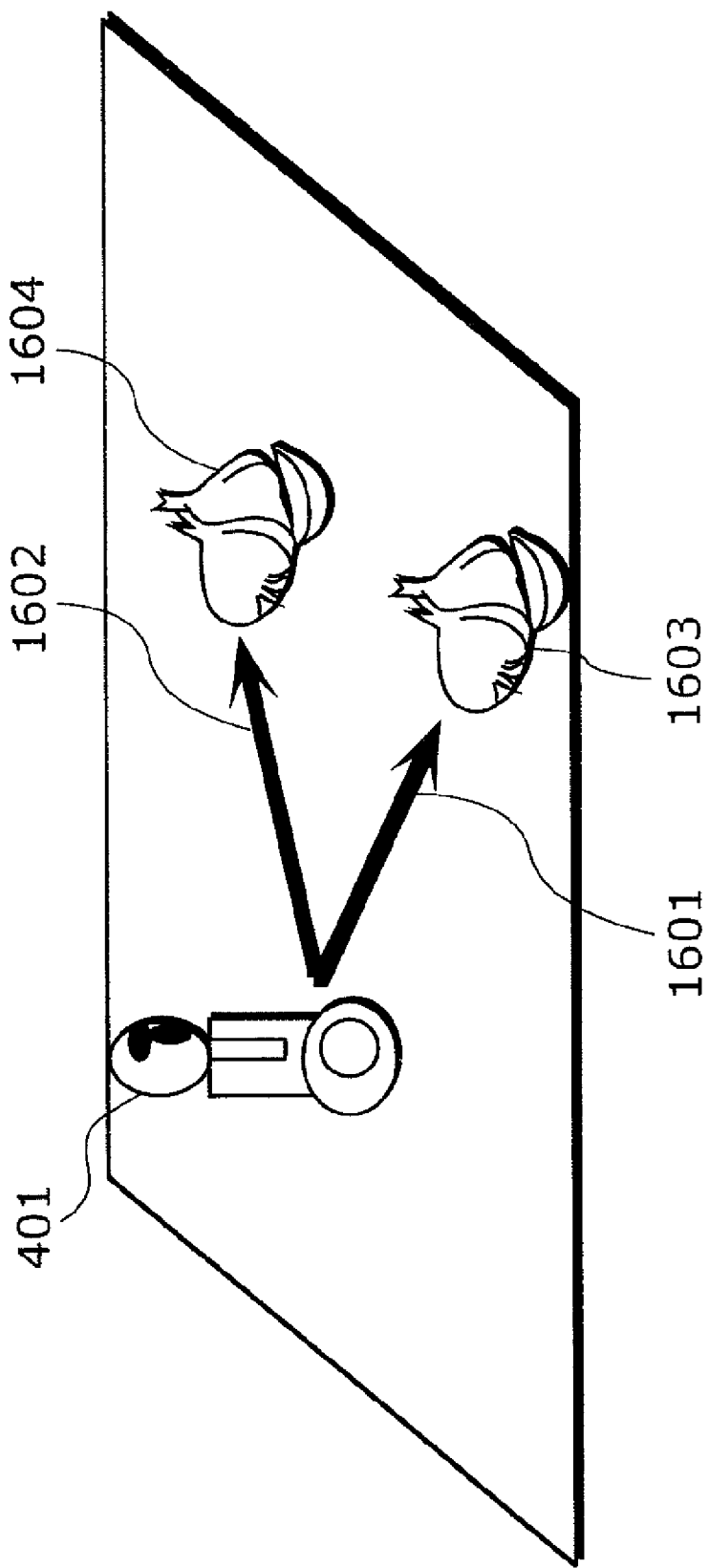
[FIG. 19]

FIG. 19 is a diagram showing an example of a case in which plural paths are assumed. When the plural garlic 1603 and 1604 are present in the environment in the grasping of garlic by the robot, plans for getting either one can be drawn up. Specifically, in the case where there is a path 1601 for getting the garlic 1603 and a path 1602 for getting the garlic 1604, the behavior planning apparatus in the sixth embodiment calculates damage risk for each of the path 1601 and the path 1602, and selects the movement path with low damage risk.

Figure 20:
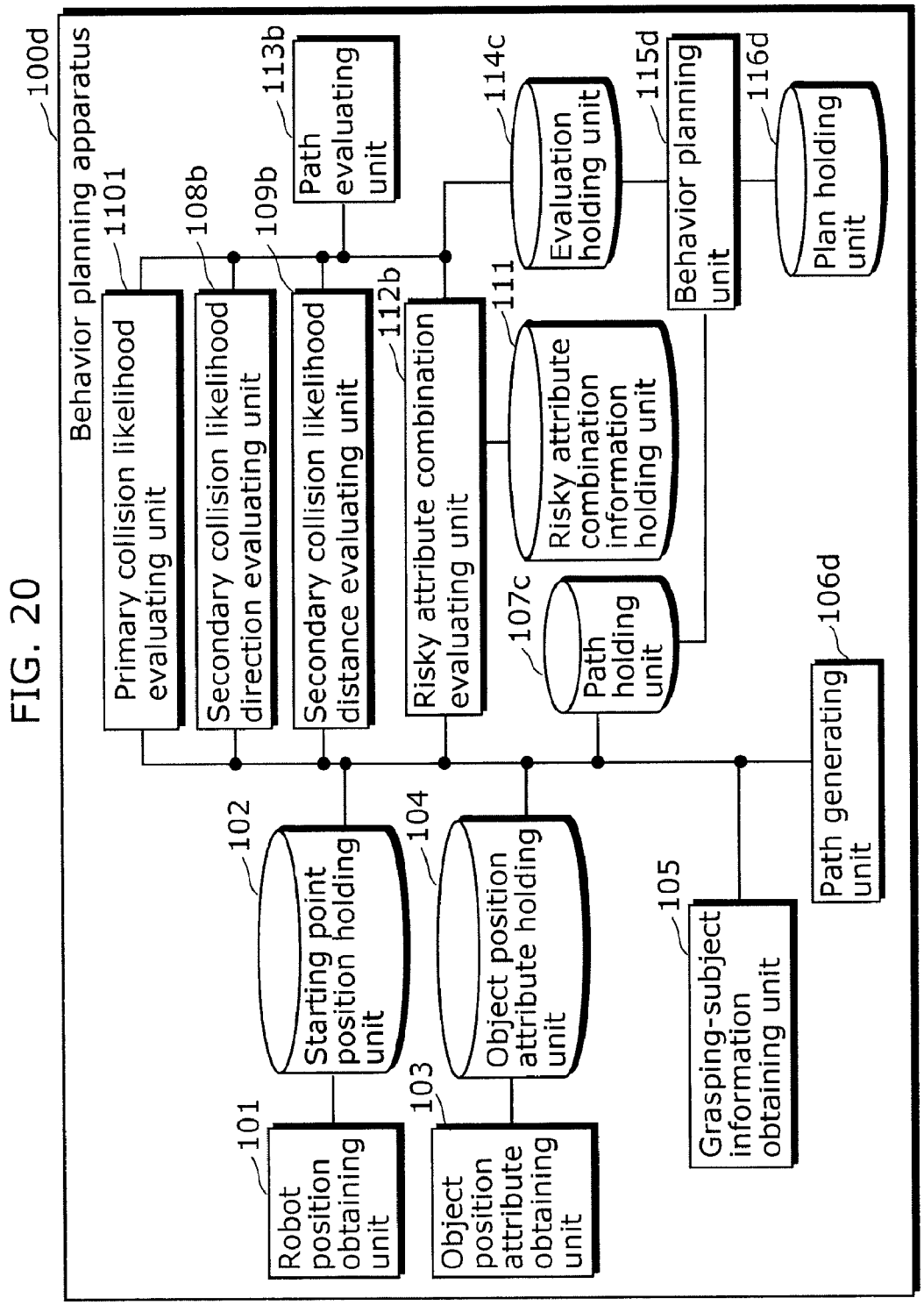
[FIG. 20]

FIG. 20 is a block diagram showing the configuration of the behavior planning apparatus 100*d* in the sixth embodiment.

The differences between the behavior planning apparatus 100*d* and the behavior planning apparatus 100*b* in the fourth embodiment shall be described hereafter. The behavior planning apparatus 100*d* uses a path generating unit 106*d*, the path holding unit 107*c*, the evaluation holding unit 114*c*, a behavior planning unit 115*d*, and a plan holding unit 116*d* in place of the path generating unit 106*b*, the path holding unit 107, the evaluation holding unit 114, the behavior planning unit 115, and the plan holding unit 116, respectively.

The path generating unit 106*d* plans the movement behavior of the robot up to the position of a specified object. For example, when "garlic" is specified, the path generating unit 106*d* obtains the position of "garlic" in the environment from the object position attribute holding unit 104. When plural pieces of the specified object are registered in the object position attribute holding unit 104, the path generating unit 106*d* plans paths for each of the objects and stores these in the path holding unit 107*c*.

The path holding unit 107*c* holds the plural paths generated by the path generating unit 106*d* in the same manner as in the fifth embodiment.

The evaluation holding unit 114*c* holds, in the same manner as in the fifth embodiment, the evaluation calculated, as damage risk, by the path evaluating unit 113 for each of the paths.

The behavior planning unit 115*d* selects the path having the smallest evaluation value, that is, the path with the lowest damage risk, from among the evaluations held by the evaluation holding unit 114*c*, and stores the selected path in the plan holding unit 116*d*.

The plan holding unit 116*d* is a storage device which holds the path, that is, the robot behavior plan, generated by the behavior planning unit 115*d*, and is configured of an HDD and so on, for example.

<First Modification>

In the sixth embodiment, it is described that, when there are plural objects with the same name such that there are plural movement paths, the path with the lowest damage risk is selected from among the paths. However, this need not be the case. For example, it is acceptable to have a configuration in which, when there are plural grasping points for one object, the path with the lowest damage risk is selected among the paths to the respective grasping points.

Furthermore, although the case of generating plural paths in advance by the path generating unit 106*d* is described here, it is also acceptable to plan one path at first, and further plan a subsequent path when the evaluation of the first path is bigger than a predetermined value.

<Second Modification>

Although the behavior planning unit 115*d* in the sixth embodiment selects the path with the lowest damage risk, selection may be performed taking into consideration an additional different element. For example, since a path having a long movement path length would incur higher consumption for costs such as energy and time, path evaluation may be performed based on the combination of damage risk and path length.

Advantageous Effect

With the configuration in the sixth embodiment, the path having lower secondary collision damage risk can be selected in the case where there are plural movement paths available for the robot to achieve a specified task.

Seventh Embodiment

In the fourth embodiment, the risk for a movement path with respect to a robot is evaluated based on the damage risk due to secondary collision. However, in the actual movement of the robot on a movement path, there is also damage risk due to primary collision.

For example, there is the possibility that a delicate flower vase made of glass, or the like, will break due to primary collision with the robot, and thus there is damage risk from breakage.

A seventh embodiment describes a behavior planning apparatus which evaluates the risk of a movement path taking into consideration damage risk due to primary collision and damage risk due to secondary collision, and draws up a behavior plan for the robot.

The damage risk due to primary collision is evaluated based on the positional relationship between the robot and objects in the environment, and on the attribute information of the objects in the environment. Specifically, the damage risk due to primary collision is evaluated based on the evaluation result of primary collision likelihood evaluation and the evaluation result of primary collision risky attribute evaluation. Here, the primary collision likelihood evaluation is an evaluation of whether an object in the environment is in a position that is collision-prone with respect to the movement path of the robot. Furthermore, the primary collision risky attribute evaluation is an evaluation of whether attribute information indicates that an object is prone to create damage when collision occurs between the robot and the object in the environment.

<Behavior Planning Apparatus>

Figure 21:
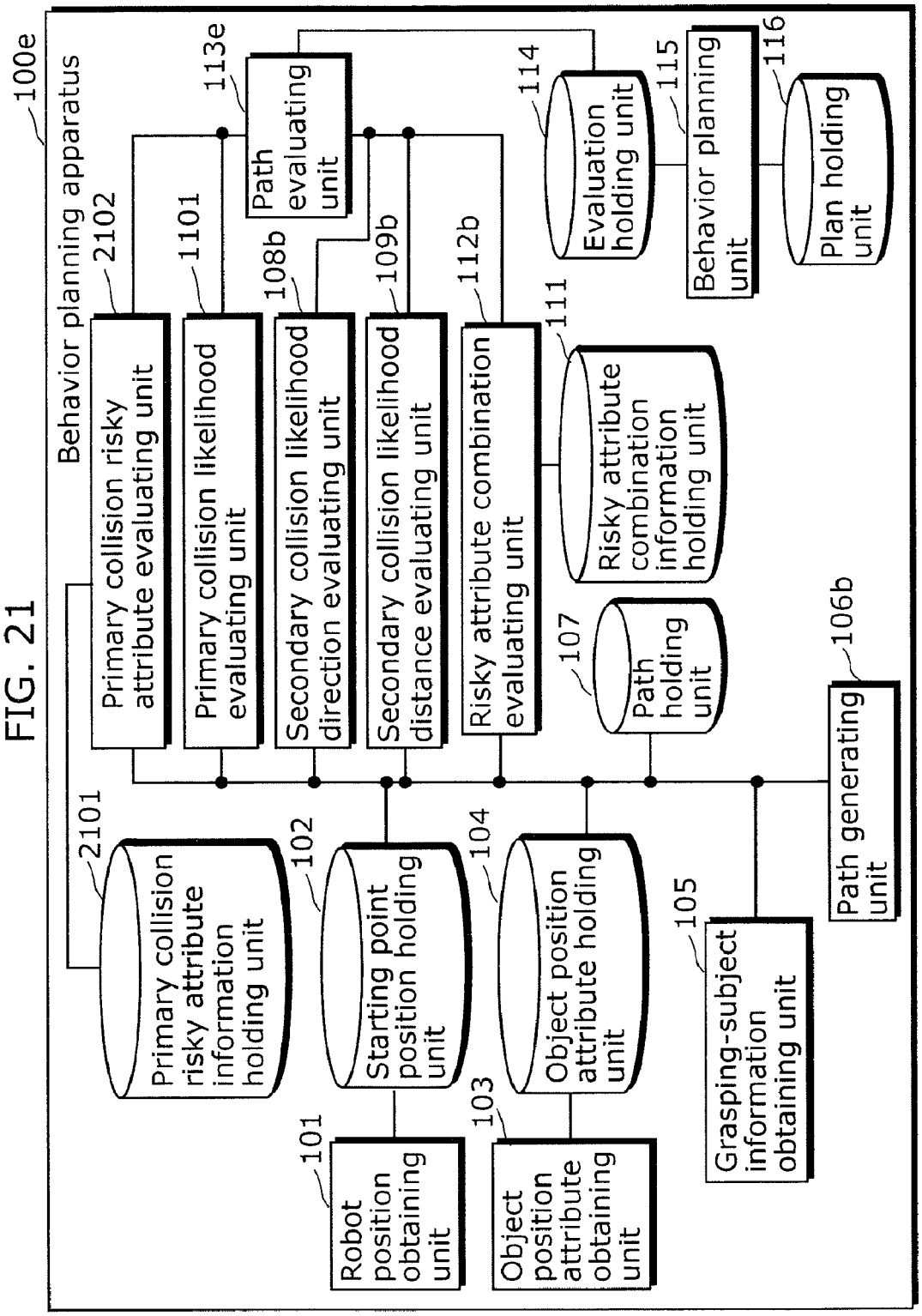
[FIG. 21]

FIG. 21 is a block diagram showing the configuration of a behavior planning apparatus 100e in the seventh embodiment.

The differences between the behavior planning apparatus 100e and the behavior planning apparatus 100b in the fourth embodiment shall be described hereafter. Specifically, the behavior planning apparatus 100e uses a path evaluating unit 113e in place of the path evaluating unit 113b in the behavior planning apparatus 100b. In addition, the behavior planning apparatus 100e includes a primary collision risky attribute information holding unit 2101 and a primary collision risky attribute evaluating unit 2102 that are not included in the behavior planning apparatus 100b.

The primary collision risky attribute information holding unit 2101 stores primary collision risky attribute information which is information indicating objects of which type of attribute information are likely to create damage in the case of a primary collision with the robot. FIG. 22 is a diagram showing an example of primary collision risky attribute information. Objects such as a glass sculpture and a plastic model are prone to breaking through contact with the robot (even without the occurrence of a secondary collision). Furthermore, for objects such as a flower pot, a cup containing a beverage, and flour, there is a possibility for the contents to be scattered about due to contact with the robot.

The primary collision risky attribute evaluating unit 2102 is a processing unit which evaluates whether the specified object is an object that may create damage in the case of a primary collision with the robot. In the subsequent description, this evaluation shall be called "primary collision risky attribute evaluation", and the evaluation value calculated at that time shall be called "primary collision risky attribute evaluation value".

The primary collision risk attribute evaluation is an evaluation for estimating the degree of damage in the case where a primary collision occurs. Damage is not necessarily created even when the robot and an object in the environment have a primary collision. For example, there is practically no damage created even when the robot and a paper clip have a primary collision. Furthermore, even in a case where damage is created, the degrees of such damage are different. For example, when the robot and a glass sculpture collide and the glass sculpture breaks, the price of the glass sculpture and the time and man-hours for cleaning the shattered glass sculpture become the amount of the damage, and at times this could be extensive damage. Inversely, the case where the robot and a spoon collide can be considered as a case where damage is small. The effort of a person washing the spoon or the time and energy of the robot washing the spoon becomes the damage but the degree of damage is small. In this manner, although the degrees of damage are varied, the degree of damage is evaluated in two stages in the seventh embodiment. Specifically, the primary collision risky attribute evaluating unit 2102 classifies the degree of damage into the case where the degree of damage is sufficiently small to be disregarded, and the case where the degree of damage is of a magnitude that cannot be disregarded. When the degree of damage is small, the behavior planning unit 115 draws up a robot behavior plan in which primary collision avoidance is not executed. It should be noted that the primary collision risky attribute evaluating unit 2102 judges that the degree of damage in a primary collision with a specified object is large when the attribute information of the specified object is stored in the primary collision risky attribute information holding unit 2101. Furthermore, the primary collision risky attribute evaluating unit 2102 judges that the degree of damage in a primary collision with the specified object is small when the attribute information of the specified object is not stored in the primary collision risky attribute information holding unit 2101.

The primary collision risk attribute evaluation by the primary collision risky attribute evaluating unit 2102 shall be described in further detail hereafter. The primary collision risky attribute evaluating unit 2102 obtains the attribute information of the specified object, from the object position attribute holding unit 104. The primary collision risky attribute evaluating unit 2102 judges whether or not the obtained attribute information is included in the attribute information held by the primary collision risky attribute information holding unit 2101. The primary collision risky attribute evaluating unit 2102 outputs the judgment result as the primary collision risk attribute evaluation value, to the path evaluating unit 113e. Here, the evaluation result is set as "1" when the obtained attribute information is included in the primary collision risky attribute information, and set to "0" when not included. It should be noted that the primary collision risky attribute information holding unit 2101 may store, for the respective primary collision attribute information shown in FIG. 22, the damage monetary amount in a collision between the object of the corresponding attribute information and the robot. In this case, when the attribute information of the specified object is included in the attribute information held by the primary collision risky attribute information holding unit 2101, the damage monetary value of such attribute information is set as the primary collision risky attribute evaluation value, and "0" is set as the primary collision risky attribute evaluation value when not included.

The path evaluating unit 113e is a processing unit which evaluates damage risk in the case where the robot moves in the path held by the path holding unit 107. The path evaluating unit 113e evaluates the damage risk of a path based on the damage risk of a primary collision and a secondary collision.

<Process Flow>

Figure 23:
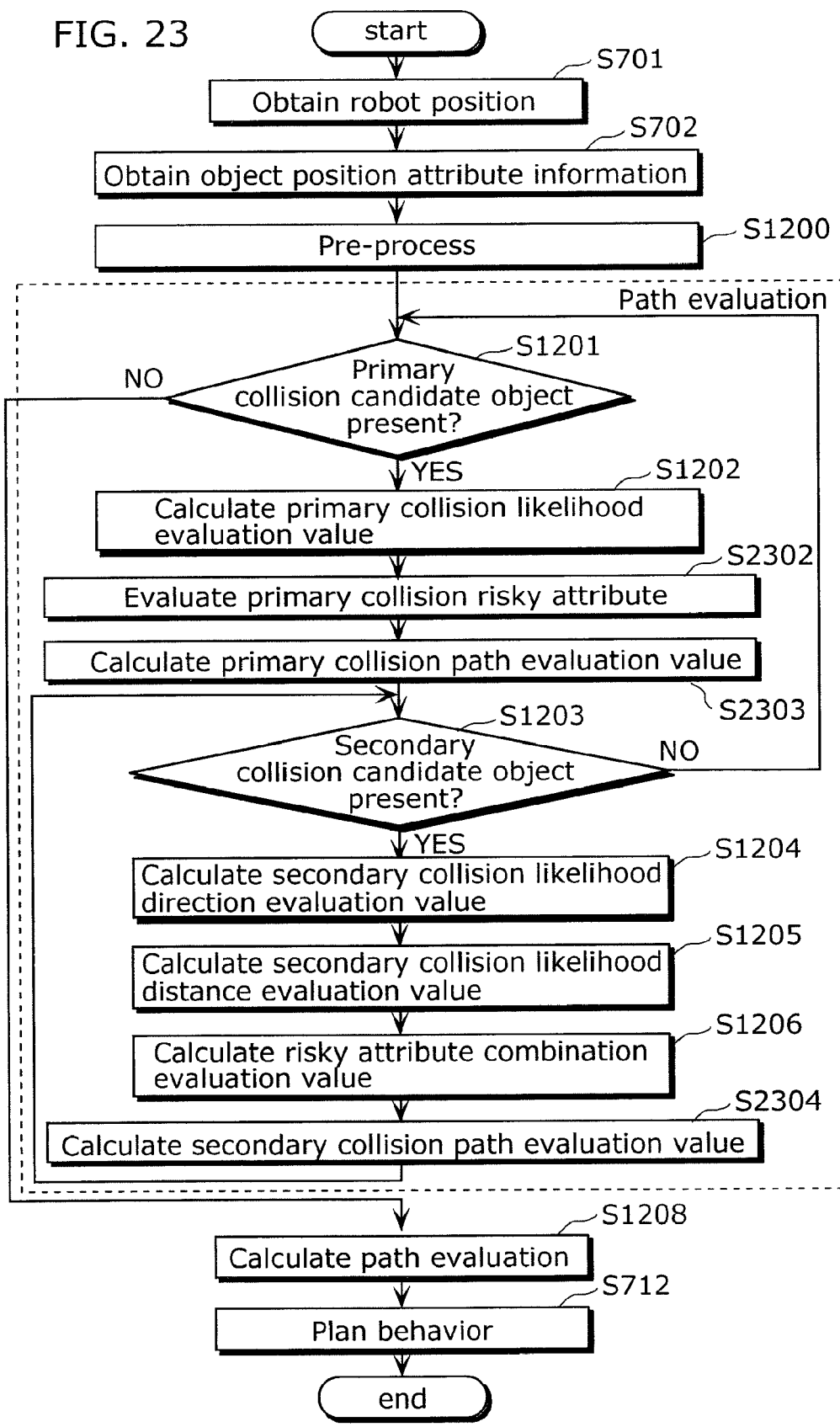
[FIG. 23]

The flow of the behavior planning performed by the behavior planning apparatus 100e is shown in FIG. 23.

The robot position obtaining unit 101 obtains the robot position, and stores this in the starting point position holding unit 102 (step S701). Furthermore, the object position attribute obtaining unit 103 obtains the object position attribute information of objects that are present in the environment, and stores these in the object position attribute holding unit 104 (step S702). The robot position obtainment process (step S701) and the object position attribute information obtainment process (step S702) are the same as those described in the first embodiment.

The path evaluating unit 113e assumes the value of the variable for evaluation storing to be 0 (step S1200).

The path evaluating unit 113e judges whether or not there are objects not obtained as a primary collision candidate object, among the objects corresponding to the attribute information held by the object position attribute holding unit 104 (step S1201). When there are objects that have not yet been obtained as a primary collision candidate object (YES in step S1201), the path evaluating unit 113e arbitrarily selects one of the not-yet-selected objects. The primary collision likelihood evaluating unit 1101 outputs the primary collision likelihood evaluation value for the selected primary collision candidate object (step S1202). The primary collision risky attribute evaluating unit 2102 calculates the primary collision risky attribute evaluation value for the selected primary collision candidate object (step S2302).

The path evaluating unit 113e calculates the primary collision path evaluation value. Here, the primary collision path evaluation value is a value indicating the damage risk in a primary collision between a moving object and the selected object, and is the product of the primary collision likelihood evaluation value and the primary collision risky attribute evaluation value. The path evaluating unit 113e adds the calculated primary collision path evaluation value and the value of the variable for evaluation storing, and stores the addition result in the variable for evaluation storing (step S2303).

The path evaluating unit 113e judges whether or not there are objects not obtained as a secondary collision candidate object, among the objects corresponding to the attribute information held by the object position attribute holding unit 104 other than the primary collision candidate object (step S1203). When there are objects that have not yet been obtained as a secondary collision candidate object (YES in step S1203), the path evaluating unit 113e arbitrarily selects one of the not-yet-selected objects, and sets the selected object as a secondary collision candidate object.

The secondary collision likelihood direction evaluating unit 108b calculates the secondary collision likelihood direction evaluation value indicating the likelihood of a secondary collision between the primary collision candidate object and the secondary collision candidate object (step S1204).

Furthermore, the secondary collision likelihood distance evaluating unit 109b calculates the secondary collision likelihood distance evaluation value indicating the likelihood of a secondary collision between the primary collision candidate object and the secondary collision candidate object (step S1205).

In addition, the risky attribute combination evaluating unit 112b calculates the risky attribute combination evaluation value indicating the likelihood of damage being created in the case of a secondary collision between the primary collision candidate object and the secondary collision candidate object (step S1206).

The path evaluating unit 113e calculates the secondary collision path evaluation value for the combination of the primary collision candidate object and the secondary collision candidate object, adds the calculated secondary collision path evaluation value and the value of the variable for evaluation storing, and stores the addition result in the variable for evaluation storing (step S2304). It should be noted that the secondary collision path evaluation value is assumed to be (secondary collision likelihood direction evaluation value)× (secondary collision likelihood distance evaluation value)× (risky attribute combination evaluation value).

After the secondary collision path evaluation value calculation process (step S2304), the processing returns to the secondary collision candidate object judgment process (step S1203), and the same processes are repeated for the remaining secondary collision candidate objects.

Furthermore, when there are no more secondary collision candidate objects (NO in step S1203), the process returns to the primary collision candidate object judgment step (step S1201), and the same processes are also repeated for the remaining primary collision candidate objects. It should be noted that, every time the primary collision candidate object changes, all the other objects are reset to the not-yet-obtained state in terms of being a secondary collision candidate object.

After the damage risk is calculated for all the combinations of the primary collision candidate objects and the secondary collision candidate objects (NO in step S1201), the path evaluating unit 113e sets the value stored in the variable for evaluation storing as the path evaluation value, and stores this in the evaluation holding unit 114 (step S1208).

The behavior planning unit 115 obtains the path evaluation value from the evaluation holding unit 114, creates a behavior plan based on the obtained path evaluation value, and stores the information indicating the planned behavior in the plan holding unit 116 (step S712), as in the first embodiment.

Advantageous Effect

With the configuration in the seventh embodiment, it is possible to reduce damage risk for primary collision and secondary collision occurring due to the movement of the robot on the movement path, and thus the advantageous effect thereof is significant.

Eighth Embodiment

The first embodiment describes a behavior planning apparatus under an assumption that the robot has a primary collision with the object to be grasped, and the object to be grasped further has a secondary collision with a neighboring object.

An eighth embodiment describes a behavior planning apparatus under an assumption that in the transportation of an object to be grasped after the robot has grasped the object to be grasped, the object to be grasped that is being transported (hereafter called "object to be transported") collides with an object in the neighborhood of the transportation path. Specifically, a case where, for example, in FIG. 5, the robot grasps the garlic at position (40, 35, 0) and moves in the X-axis direction so as to transport the garlic up to position (70, 35, 0), is assumed.

<Secondary Collision Between a Transported Object and a Neighboring Object>

In the transportation of an object to be transported by the robot, there are cases where the robot drops the object to be transported and causes it to bounce off the robot. This is caused by inaccuracy in predicting the power required to grasp the object to be transported so that it is not dropped, or unevenness of the ground, vibration arising from the motor of the robot itself, overturning due to slipping, and so on. There are cases where object to be transported that is dropped by the robot or the object to be transported that has bounced off the robot has a secondary collision with a neighboring object. At that time, damage is created depending on the combination of a first object which is being transported by the robot and a second object that comes into contact with the first object.

<Behavior Planning Apparatus>

Figure 24:
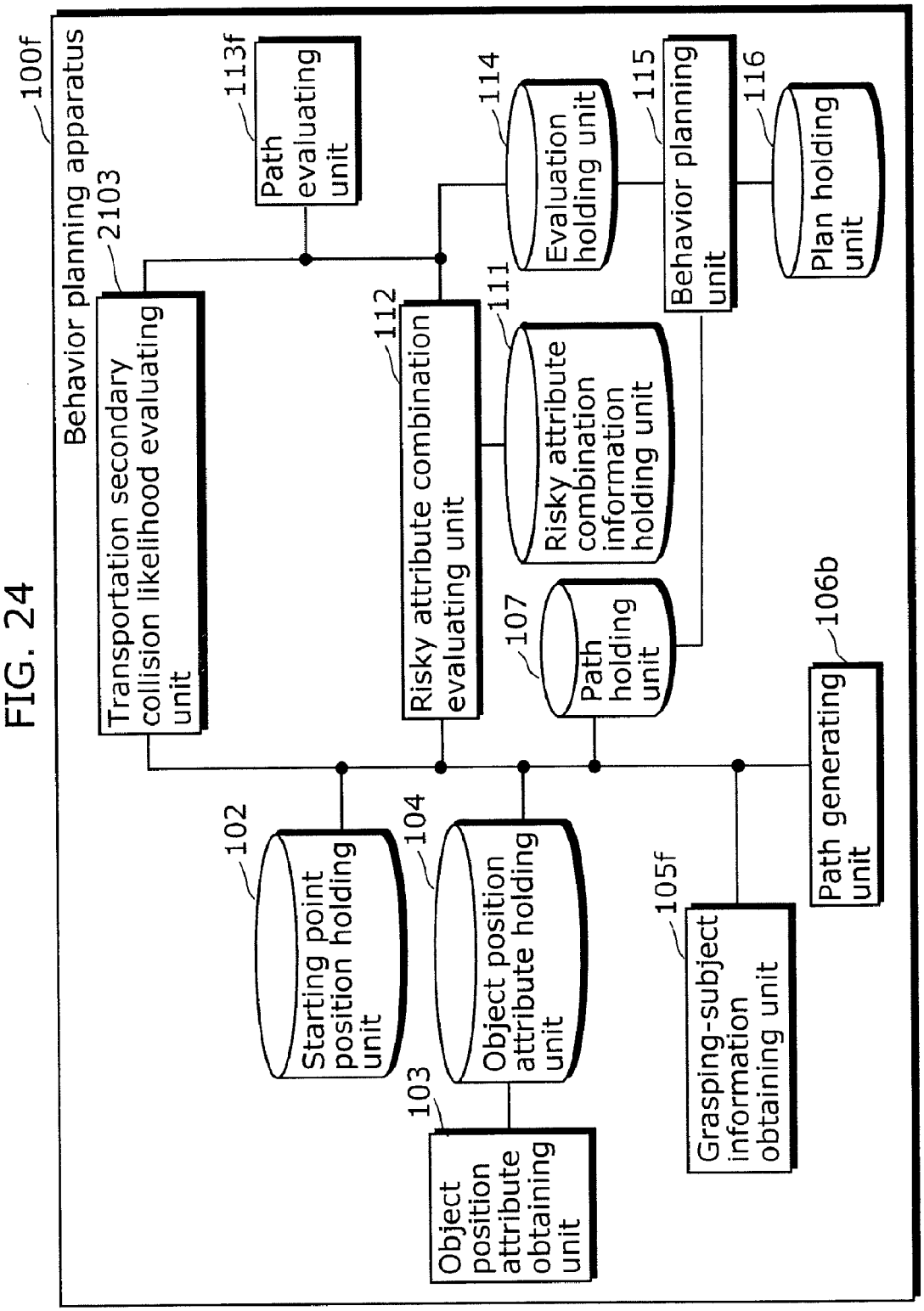
[FIG. 24]

FIG. 24 is a block diagram showing the configuration of a behavior planning apparatus $100f$ in the eighth embodiment. The differences between the behavior planning apparatus $100f$ and the behavior planning apparatus 100 in the first embodiment shall be described hereafter. Specifically, the behavior planning apparatus $100f$ uses, in place of the grasping-subject information obtaining unit 105, the path evaluating unit 113, and the path generating unit 106 in the behavior planning apparatus 100b, a grasping-subject information obtaining unit $105f$, a path evaluating unit $113f$, and the path generating unit $106b$ described in the fourth embodiment, respectively.

Furthermore, the behavior planning apparatus $100f$ does not use the secondary collision likelihood direction evaluating unit 108, the secondary collision likelihood distance evaluating unit 109, and the robot position obtaining unit 101, and uses a transportation secondary collision likelihood evaluating unit 2103.

The grasping-subject information obtaining unit $105f$ is a processing unit which obtains the position and the type of the object to be grasped which is to be transported. The grasping-subject information obtaining unit $105f$ obtains the position and the type of an object to be grasped by performing the same processing as with the grasping-subject information obtaining unit 105 in the first embodiment. In addition, the grasping-subject information obtaining unit $105f$ stores the obtained position of the object to be grasped in the starting point position holding unit 102. In this manner, by setting the position at which the robot grasps the object to be grasped as the starting point, it is possible to evaluate the risk for the transportation path for the object to be grasped. Specifically, in a case where, for example, in FIG. 5, the robot grasps the garlic at position (40, 35, 0) so as to transport the garlic, the coordinates for the starting point is (40, 35, 0). It should be noted that the evaluation for the risk up to when the robot moves to the position of the object to be grasped is described in the first embodiment. As such, detailed description thereof shall not be repeated.

The transportation secondary collision likelihood evaluating unit 2103 evaluates how collision-prone the position of a specified object in the environment is with respect to the movement path for the object to be transported. In the subsequent description, this evaluation shall be called "transportation secondary collision likelihood evaluation", and the evaluation value calculated at that time shall be called "transportation secondary collision likelihood evaluation value". The calculation method for the transportation secondary collision likelihood evaluation value is the same as the calculation method for the primary collision likelihood evaluation value in the fourth embodiment. Specifically, in a case where, for example, in FIG. 5, the robot is to transport the garlic from position (40, 35, 0) to position (70, 35, 0), the primary collision likelihood evaluation value for the cake is the distance from the line segment connecting position (40, 35, 0) and position (70, 35, 0) up to the position (50, 15, 0) of the cake, and the value of such distance is "20". As such, according to the same calculation method as that for the primary collision likelihood evaluation value, the transportation secondary collision likelihood evaluation value is the Euler number e raised to the −20th power ($e^{-20}$).

The path evaluating unit $113f$ is a processing unit which evaluates damage risk in the case where the object to be transported and an object in the environment come into contact with or come close to each other when the robot moves in the path held by the path holding unit 107. The damage risk is evaluated based on an evaluation of whether the object to be transported and the object in the environment are in a positional relationship in which they are prone to come into contact with or come close to each other, and on an evaluation of whether the object in the environment is a risky object for the object to be transported.

<Process Flow>

Figure 25:
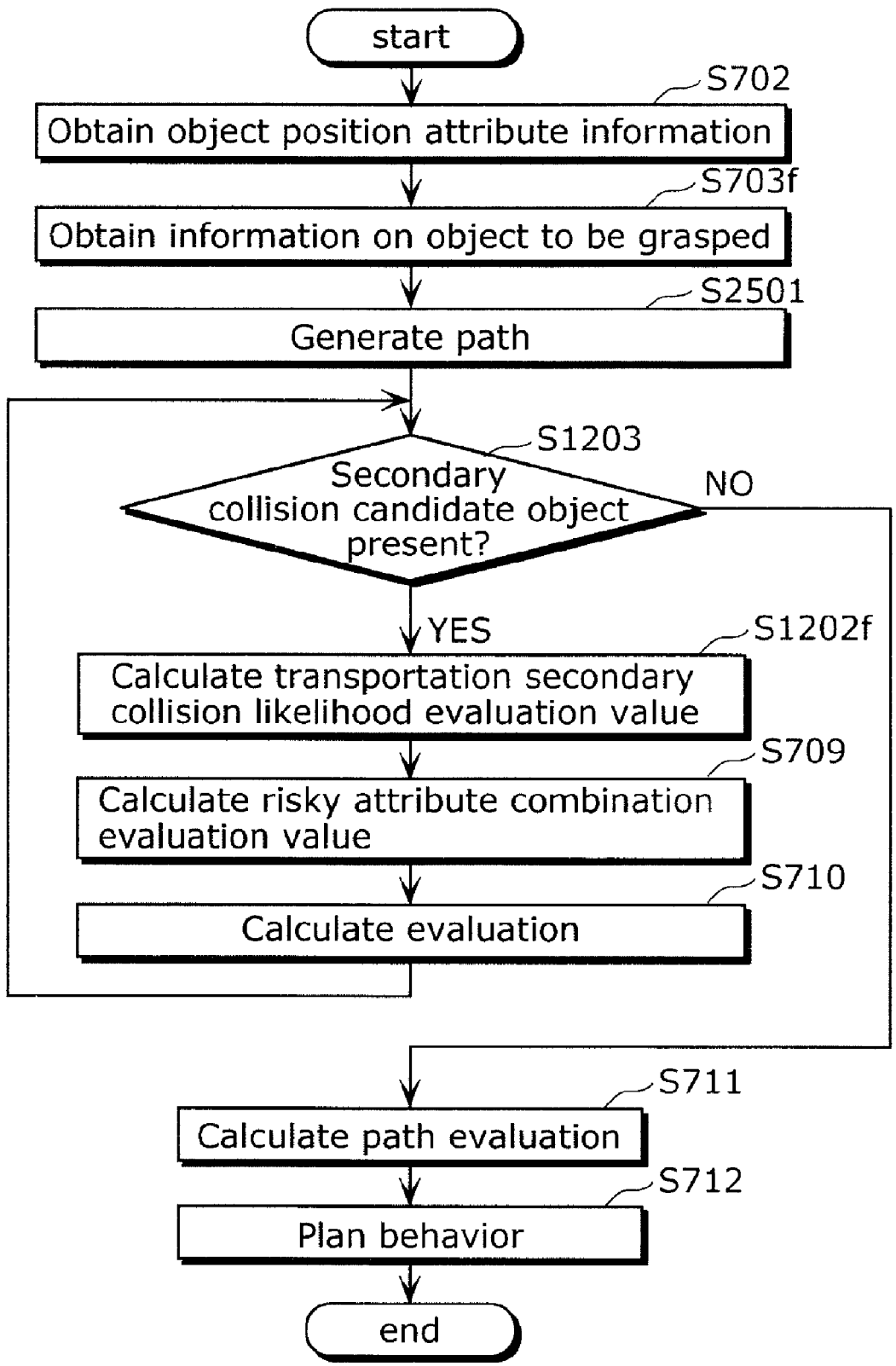
[FIG. 25]

The flow of the behavior planning performed by the behavior planning apparatus $100f$ is shown in FIG. 25.

The object position attribute obtaining unit 103 obtains the object position attribute information of objects that are present in the environment, and stores these in the object position attribute holding unit 104 (step S702).

The grasping-subject information obtaining unit $105f$ obtains the position of the object to be grasped, and outputs this to the transportation secondary collision likelihood evaluating unit 2103, and the path evaluating unit $113f$. Furthermore, the grasping-subject information obtaining unit $105f$ outputs the attribute information of the object to be grasped to the risky attribute combination evaluating unit 112. In addition, the grasping-subject information obtaining unit $105f$ stores the position of the object to be grasped in the starting point position holding unit 102 (step $S703f$). Specifically, in a case where, for example, in FIG. 5, the robot grasps the garlic at position (40, 35, 0) so as to transport the garlic, the coordinates for the starting point is (40, 35, 0).

The path generating unit 106b obtains the movement destination of the robot from outside the apparatus, generates a path, and stores the generated path in the path holding unit 107 (step S2501). Specifically, in a case where, for example, in FIG. 5, the robot is specified to transport the garlic to position (70, 35, 0), the directed line segment having position (40, 35, 0) as the starting point and position (70, 35, 0) as the ending point becomes the path.

The path evaluating unit $113f$ judges whether or not there are objects not obtained as a secondary collision candidate object, among the objects corresponding to the attribute information held by the object position attribute holding unit 104 other than the object to be transported (step S1203). When there are objects that have not yet been obtained as a secondary collision candidate object (YES in step S1203), the path evaluating unit $113f$ arbitrarily selects one of the not-yet-selected objects, and sets the selected object as a secondary collision candidate object.

The transportation secondary collision likelihood evaluating unit 2103 calculates the transportation secondary collision likelihood evaluation value for the specified secondary collision candidate object with respect to the movement path for the object to be transported (step $S1202f$). Here, the movement path for the object to be transported is assumed to be similar to the movement path of the robot.

The risky attribute combination evaluating unit 112 calculates the risky attribute combination evaluation value of the secondary collision candidate object, and outputs this to the path evaluating unit 113*f* (step S709).

The path evaluating unit 113*f* calculates the evaluation value of the secondary collision candidate object based on the transportation secondary collision likelihood evaluation value calculated in the transportation secondary collision likelihood evaluation process (step S1202*f*), and the risky attribute combination evaluation value calculated in the risky attribute combination obtainment process (step S709). In other words, the path evaluating unit 113 calculates the damage risk in the case where a secondary collision occurs (step S710). The specific calculation method is the same as that in the first embodiment. In other words, the product of the transportation secondary collision likelihood evaluation value and the risky attribute combination evaluation value is assumed to be the damage risk in the case where a secondary collision occurs.

After the evaluation calculation process (step S710), the processing returns to the secondary collision candidate object judgment process (step S1203), and the same processes are repeated for the remaining secondary collision candidate objects.

When there are no longer any objects that have not yet been obtained as a secondary collision candidate object (NO in step S704), the path evaluating unit 113*f* calculates a path evaluation value based on the respective candidate evaluations calculated in the evaluation calculation process (step S710). The calculated path evaluation value is stored in the evaluation holding unit 114 (step S711). The specific calculation method is the same as that in the first embodiment.

The behavior planning unit 115 obtains the path evaluation value from the evaluation holding unit 114, creates a behavior plan based on the obtained path evaluation value, and stores the information indicating the planned behavior in the plan holding unit 116 (step S712). The specific calculation method is the same as that in the first embodiment.

Advantageous Effect of the Eighth Embodiment

As described above, according to the eighth embodiment, for a robot moving in a household environment, it is possible to judge whether or not secondary damage will be created in the case where an object that has come into contact with the moving robot further comes into contact with an object in the neighborhood of the transportation path. With this, behavior planning for the moving robot can be performed. Accordingly, secondary damage can be reduced.

Although the path risk evaluation apparatus of the present invention has been described thus far based on the embodiments, the present embodiment is not limited to these embodiments. Various modifications to the present embodiments that can be conceived by those skilled in the art, and forms configured by combining constituent elements in different embodiments without departing from the teachings of the present invention are included in the scope of the present invention.

It should be noted that although a robot is given as an example of a mobile device, as long as the mobile device is one that moves in a movement path, such as an autonomous vehicle, the present invention can be applied.

The embodiments currently disclosed are, in all points, examples and are not restricting. The scope of the present invention is indicated, not by the above description, but by the Claims, and all modifications that have equivalent meaning or are within the scope of the Claims are intended to be included.

INDUSTRIAL APPLICABILITY

The present invention can be applied to a behavior planning apparatus for drawing up a behavior plan for a moving robot since it is possible to draw up a behavior plan for a mobile device, such as a robot, which takes into consideration the risk due to secondary collision, in a place, such as a household environment, where many objects are present and secondary collisions can occur.

REFERENCE SIGNS LIST

100, 100*a*, 100*b*, 100*c*, 100*d*, 100*e*, 100*f* Behavior planning apparatus
101, 101*a* Robot position obtaining unit
102, 102*a* Starting point holding unit
103 Object position attribute obtaining unit
104 Object position attribute holding unit
105, 105*f* Grasping-subject information obtaining unit
106, 106*a*, 106*b*, 106*c*, 106*d* Path generating unit
107, 107*a*, 107*c* Path holding unit
108, 108*b* Secondary collision likelihood direction evaluating unit
109, 109*b* Secondary collision likelihood distance evaluating unit
111 Risky attribute combination information holding unit
112, 112*b* Risky attribute combination evaluating unit
113, 113*a*, 113*b*, 113*e*, 113*f* Path evaluating unit
114, 114*c* Evaluation holding unit
115, 115*c*, 115*d* Behavior planning unit
116, 116*c*, 116*d* Plan holding unit
401, 800 Robot
801 Movement device
802 Behavior change instruction device
803 Work table
805 Robot system
901 Robot arm
1101 Primary collision likelihood evaluating unit
1501 Excluded region holding unit
2101 Primary collision risky attribute information holding unit
2102 Primary collision risky attribute evaluating unit
2103 Transportation secondary collision likelihood evaluating unit

The invention claimed is:

1. A path risk evaluating apparatus for evaluating risk of a movement path of a mobile device, said path risk evaluating apparatus comprising:

a secondary collision likelihood evaluating unit configured to evaluate a likelihood of a first object that has a likelihood of being moved by contact with the mobile device coming into contact with or coming close to a second object, based on a relationship between the movement path of the mobile device indicated in movement path information and positions of objects indicated in position information, the movement path information being information indicating a movement path of the mobile device, and the position information being information indicating positions of objects present in an environment in which the mobile device moves;

a risky attribute combination evaluating unit configured to determine a degree of damage in the case where the first object and the second object come into contact with or come close to each other, by referring to information indicating degrees of damage in the case where pairs of the objects come into contact with or come close to each other; and a path evaluating unit configured to evaluate the risk of the movement path for the mobile device, based on a result of the evaluation by said secondary collision likelihood evaluation unit and the degree of damage determined by said risky attribute combination evaluating unit.

2. The path risk evaluating apparatus according to claim 1, wherein said path evaluating unit is configured to evaluate that the risk of the moving path for the mobile device increases with an increase in a product obtained by multiplying an evaluation value indicating the evaluation by said secondary collision likelihood evaluating unit and a value indicating the degree of damage determined by the risky attribute combination evaluating unit.

3. The path risk evaluating apparatus according to claim 1, wherein said secondary collision likelihood evaluating unit includes a secondary collision likelihood direction evaluating unit configured to evaluate the likelihood of the first object coming into contact with or coming close to the second object, by calculating a secondary collision likelihood direction evaluation value which increases as an angle, which is created by a movement direction of the mobile device in the movement path and a straight line connecting a position of the first object and a position of the second object, approaches zero degrees.

4. The path risk evaluating apparatus according to claim 3, wherein said secondary collision likelihood direction evaluating unit is configured to evaluate the likelihood of the first object coming into contact with or coming close to the second object, by calculating the secondary collision likelihood direction evaluation value which is largest when a straight line passing a center position of the first object intersects a circumscribed circle of the second object, the straight line being obtained by translation of the movement path.

5. The path risk evaluating apparatus according to claim 3, wherein said secondary collision likelihood direction evaluating unit is configured to evaluate the likelihood of the first object coming into contact with or coming close to the second object, by calculating the secondary collision likelihood direction evaluation value which is largest when a circumscribed circle of the first object and a circumscribed circle of the second object come into contact when it is assumed that the circumscribed circle of the first object passes beyond a straight line which passes a center position of the first object and is obtained by translation of the movement path.

6. The path risk evaluating apparatus according to claim 1, wherein said secondary collision likelihood evaluating unit includes a secondary collision likelihood distance evaluating unit configured to evaluate the likelihood that the first object contacts or approaches the second object, by calculating a secondary collision likelihood distance evaluation value which increases as a distance between the first object and the second object decreases.

7. The path risk evaluating apparatus according to claim 6, wherein said secondary collision likelihood distance evaluating unit is configured to evaluate the likelihood that the first object contacts or approaches the second object, by calculating the secondary collision likelihood distance evaluation value which increases as the distance between the first object and the second object decreases and a size of the second object increases.

8. The path risk evaluating apparatus according to claim 1, further comprising a primary collision likelihood evaluating unit configured to evaluate the likelihood that the mobile device contacts or approaches the first object, by calculating a primary collision likelihood evaluation value which increases as a distance between the movement path and the first object decreases, wherein said path evaluating unit is configured to evaluate the risk of the moving path for the mobile device, based on a result of the evaluation by said secondary collision likelihood evaluating unit, the degree of damage determined by said risky attribute combination evaluating unit, and a result of the evaluation by said primary collision likelihood evaluating unit.

9. The path risk evaluating apparatus according to claim 8, wherein said attribute combination evaluating unit is configured to determine a degree of damage in the case where the mobile device and the first object come into contact with or come close to each other, by referring to information indicating degrees of damage in the case where the mobile device comes into contact with or comes close to each of the objects present in the environment, and wherein said path evaluating unit is configured to evaluate the risk of the moving path for the mobile device, based on the result of the evaluation by said secondary collision likelihood evaluating unit, the degree of damage determined by said risky attribute combination evaluating unit, the result of the evaluation by said primary collision likelihood evaluating unit, and the degree of damage determined by said risky attribute combination evaluating unit.

10. The path risk evaluating apparatus according to claim 1, wherein the movement path information is information indicating a movement path of plural points of the mobile device, said secondary collision likelihood evaluating unit is configured to evaluate the likelihood that the first object contacts or approaches the second object, for each of the plural points of the mobile device, and said path evaluating unit is configured to evaluate the risk of the movement path for the mobile device, by evaluating the risk of the movement path for each of the plural points of the mobile device and totaling, for the plural points, a result of the evaluation for each of the plural points.

11. The path risk evaluating apparatus according to claim 1, further comprising a behavior planning unit configured to determine, according to a result of the evaluation by said path evaluating unit, a slower movement speed on the movement path for the mobile device as the risk of the movement path for the mobile device increases.

12. The path risk evaluating apparatus according to claim 1, wherein the first object is different from an object on which the mobile device is to perform an operation, and said path risk evaluating apparatus further comprises a path generating unit configured to judge whether or not the risk of the movement path evaluated by said path evaluating unit exceeds a predetermined risk, to generate the movement path of the mobile device that does not pass through the evaluated movement path when the predetermined risk is exceeded.

13. The path risk evaluating apparatus according to claim 1, wherein the first object is an object on which the mobile device is to perform an operation, and said path risk evaluating apparatus further comprises
a behavior planning unit configured to determine, when there is a plurality of first objects including the first object, a movement path that is evaluated by said path evaluating unit as having a lowest risk among movement paths of the plurality of first objects, as the movement path of the mobile device.

14. The path risk evaluating apparatus according to claim 1, wherein said risky attribute combination evaluation unit is configured to determine, as the degree of damage in the case where the first object and the second object come into contact with or come close to each other, the damage monetary amount in the case where the first object and the second object come into contact with or come close to each other, by referring to information on damage monetary amounts in the case where the objects present in the environment come into contact with or come close to each other, as the information indicating degrees of damage.

15. The path risk evaluating apparatus according to claim 1, wherein the first object is an object to be transported by the mobile device.

16. A non-transitory computer-readable medium on which a program is stored, the program being for evaluating risk of a movement path of a mobile device, said program causing a computer to execute a path risk evaluating method comprising:
   evaluating a likelihood of a first object that has a likelihood of being moved by contact with the mobile device coming into contact with or coming close to a second object, based on a relationship between a movement path of the mobile device and positions of objects present in an environment in which the mobile device moves, the movement path of the mobile device being indicated in movement path information, and the positions of the objects being indicated in position information;
   determining a degree of damage in the case where the first object and the second object come into contact with or come close to each other, by referring to information indicating degrees of damage in the case where the objects present in the environment come into contact with or come close to each other; and
   evaluating the risk of the movement path for the mobile device, based on a result of the evaluation in said evaluating of a likelihood and the degree of damage determined in said determining.

17. A computer-executable program embodied on a non-transitory computer-readable medium, said program for evaluating risk of a movement path of a mobile device, and said program causing a computer to execute:
   evaluating a likelihood of a first object that has a likelihood of being moved by contact with the mobile device coming into contact with or coming close to a second object, based on a relationship between a movement path of the mobile device and positions of objects present in an environment in which the mobile device moves, the movement path of the mobile device being indicated in movement path information, and the positions of the objects being indicated in position information;
   determining a degree of damage in the case where the first object and the second object come into contact with or come close to each other, by referring to information indicating degrees of damage in the case where the objects present in the environment come into contact with or come close to each other; and
   evaluating the risk of the movement path for the mobile device, based on a result of the evaluation in said evaluating of a likelihood and the degree of damage determined in said determining.

* * * * *